(12) United States Patent
Feferberg

(10) Patent No.: US 12,440,704 B2
(45) Date of Patent: Oct. 14, 2025

(54) TILTINGLY OSCILLATING ULTRASOUND TREATMENT DEVICE

(71) Applicant: Ilan Feferberg, Rishon Lezion (IL)

(72) Inventor: Ilan Feferberg, Rishon Lezion (IL)

( * ) Notice: Subject to any disclaimer, the term of this patent is extended or adjusted under 35 U.S.C. 154(b) by 0 days.

(21) Appl. No.: 18/845,887

(22) PCT Filed: Mar. 14, 2023

(86) PCT No.: PCT/IL2023/050264
§ 371 (c)(1),
(2) Date: Sep. 11, 2024

(87) PCT Pub. No.: WO2023/187774
PCT Pub. Date: Oct. 5, 2023

(65) Prior Publication Data
US 2025/0186805 A1    Jun. 12, 2025

(30) Foreign Application Priority Data
Mar. 29, 2022   (IL) .......................................... 291793

(51) Int. Cl.
*A61N 7/00* (2006.01)
*A61N 1/04* (2006.01)

(52) U.S. Cl.
CPC .............. *A61N 7/00* (2013.01); *A61N 1/0408* (2013.01); *A61N 2007/0078* (2013.01); *A61N 2007/0091* (2013.01)

(58) Field of Classification Search
CPC .................... A61N 7/00; A61N 1/0408; A61N 2007/0078; A61N 2007/0091
See application file for complete search history.

*Primary Examiner* — Bo Joseph Peng
(74) *Attorney, Agent, or Firm* — Meitar Patents Ltd.; Daniel Kligler

(57) ABSTRACT

Method and system for ultrasound treatment. An ultrasound device having at least one tilting ultrasound transducer is deployed onto skin tissue overlying a treatment region of internal tissue of a treated body part. The transducer is induced to transmit ultrasound energy onto skin tissue, such that a body interface implement of the transducer interfaces with the skin tissue surface. A motor-driven oscillator coupled with transducer is oscillated about an oscillation-axis relative to skin tissue surface such that at least one of: a position of the body interface implement, a tilt direction of the body interface implement, and a propagation direction of transmitted ultrasound, oscillates about oscillation-axis. Ultrasound device may be maneuvered to roam over skin tissue along at least one trajectory. Body shape parameters of the treated body part are measured using a measurement assembly including an imaging device, a green screen, and scale markers.

20 Claims, 10 Drawing Sheets

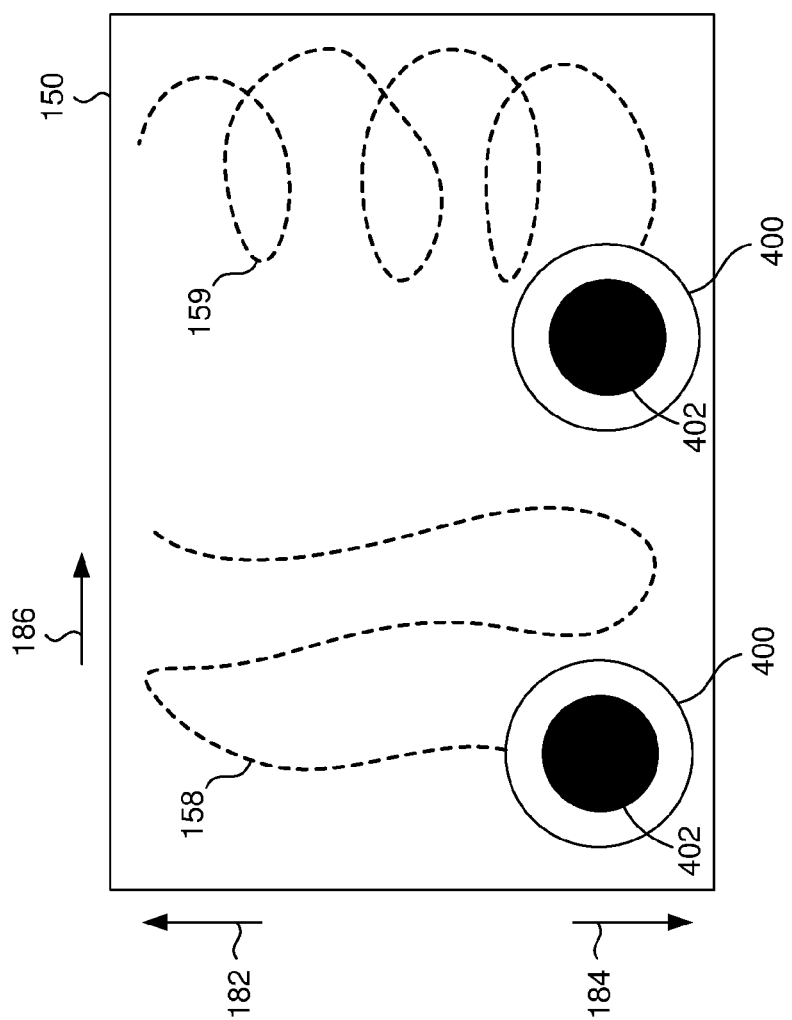

TILTINGLY OSCILLATING ULTRASOUND TREATMENT DEVICE

FIELD OF THE INVENTION

The present invention relates, in general, to methods and devices for ultrasound treatment, and, in particular, to aesthetic and therapeutic treatment using ultrasound devices.

BACKGROUND OF THE INVENTION

Ultrasound therapy is an electrotherapy which has been used in physiotherapy practices for almost a century. Ultrasound therapy is mainly applied for its non-thermal effect, as high frequency sound waves initiate vibrations and activity of cellular material, which may improve the healing rate of certain soft tissues. In particular, ultrasound energy may increase blood flow in the applied area, so as to accelerate the resolution time of an inflammatory process, and to stimulate the production of collagen (the main protein in tendons and ligaments) during tissue healing. Common injuries treated with ultrasound include: bursitis, tendonitis, muscle strains and tears, osteoarthritis, and ligament and tendon injuries. In recent years, the use of physiotherapy tools and techniques for aesthetic body treatments, also referred to as "physio-aesthetics" is becoming more prevalent, and there is a proliferation of physiotherapy centers and practitioners offering aesthetic treatments alongside customary therapeutic treatments.

The accepted technique of applying ultrasound treatment involves an operator positioning an ultrasound transducer on the skin in the region of the tissue requiring treatment and performing slow massaging movements in a circular or stroking movement pattern (e.g., back-and-forth and/or side-to-side). The circular or stroking movement pattern serves a dual purpose, firstly by creating a massaging effect which combines with the ultrasound radiation to enhance the therapeutic effect on the treated tissue, and secondly by distributing the treatment over an expansive region which encompasses the tissue to be treated.

The pace at which the transducer is advanced along the skin may derive from conflicting factors. On the one hand, the need for effective energy absorption in the internal tissue requires retaining the transducer in a fixed position on the body. On the other hand, to prevent damaging of the skin and subcutaneous tissue requires shortening the radiation time at any one position. This conflict is exacerbated by the fact that the radiation energy is highest at the tip of the transducer and dissipates rapidly as the radiation propagates through the tissue layers. This intensifies the need for prolonging the energizing of the internal tissue at a sufficiently high energy level, in order to procure a desired therapeutic or aesthetic effect, while also, however, elevating the risk of harm to outer skin and subcutaneous tissues as the energy level is raised and the energizing time is extended at any one position.

A comprehensive review conducted by Robertson and Baker (*Physical Therapy*, Volume 81, Issue 7, 1 Jul. 2001, Pages 1339-1350), questioned the effectivity of the accepted and prevalent form of treatment of applying ultrasound energy to treat various physiotherapeutic issues. After analyzing 35 studies they concluded that "there was little evidence that active therapeutic ultrasound is more effective than placebo ultrasound for treating people with pain or a range of musculoskeletal injuries or for promoting soft tissue healing".

Korean Registered Patent no. 102094905, to IUCF Sunmoon Univ (KR), entitled "Hand-piece of Ultrasonic Therapy System for Treatment, and Ultrasonic Therapy System for Treatment Having the Same" discloses a handpiece body with an ultrasonic ceramic unit positioned at its front end, configured to be in contact with the skin of a patient and to irradiate ultrasonic energy to the skin of the patient. An ultrasonic ceramic rotation motor which is positioned in the hand-piece body rotates the ultrasonic ceramic unit flatly against the skin of the patient, and a ceramic supporting spring member elastically supports the ultrasonic ceramic unit to improve massaging ability along a curved surface. By automatically rotating the ultrasonic ceramic unit in contact with the skin, the invention is intended to facilitate a stable therapy for prolonged time periods, improve ultrasonic therapy efficiency, and prevent the operator developing wrist pains and infections.

U.S. Patent Application No. 2012/0310232 to Erez, entitled: "System and method for treating a tissue using multiple energy types", is directed to skin treatment using a combination of non-focused ultrasound and radio frequency (RF) energies. At least two flat transducers is configured to produce sound waves at surface and inner layer of the skin. A plurality of RF electrodes is configured to emit a plurality of RF signals. A control unit is configured to control the transducers such that an interference of the sound waves sustains a predefined level of energy at a specific tissue below the surface of the skin.

Japan Patent Application No. 2009291600A to TEIJIN PHARMA LTD, entitled: "Oscillator fixture having oscillator angle-varying mechanism", discloses an oscillator fixture for an ultrasound transducer. The oscillator fixture included one or two or more shafts and is divided into two or more structures, which are connected to each other by an angle variable rotating mechanism.

U.S. Patent Application No. 2011/0112445 to Naldoni, entitled: "Handpiece for ultrasound treatments of human tissue", discloses a handpiece to carry out ultrasound treatments of human tissue to remove localised adiposity, cellulite, etc. The handpiece comprises a box-shaped body presenting a basin-like concave element, the contour of which (CNT), in use, is rested on the skin to be treated. The handpiece comprises two ultrasound transducers located on the walls of the concave element, the ultrasound transducers being inclined with respect to each other at an angle adjustable by electromechanical means. Between the two ultrasound transducers is a suction mouth connected to a vacuum pump. The suction mouth is suited to lift a portion of skin, in such a way that two adjoining portions of skin, covered with massage oil or gel, are brought into contact with the ultrasound transducers.

Korean Patent Application Publication No. 20170048289A, entitled: "Ultrasound cartridge for high intensity focused ultrasound device", discloses an ultrasound cartridge for high intensity focused ultrasound device used in connection with an operation handpiece of an ultrasonic apparatus for skin beauty treatment. The ultrasound cartridge is detachably attached to the operation handpiece. A cartridge body is filled with a medium for transmitting ultrasound to one side and having a transmitting member for transmitting ultrasonic waves. An ultrasound diagnostic unit is provided in the cartridge body for generating a thermal focal point of the high intensity focused ultrasound (HIFU) non-invasively at a predetermined depth from the surface of the skin through the permeable member during operation. The ultrasound therapy unit includes a first transducer and a second transducer for converting electrical energy into ultrasonic energy, where the transducers may be sequentially disposed along a longitudinal direction of the handpiece.

U.S. Patent Application No. 2018/0353778 to Jeong, entitled: "Therapeutic ultrasonic wave generating device", discloses a device that includes a rotating motor, an ultrasonic wave generating unit provided with a transducer generating ultrasonic waves, and a focus rotation movement unit moving the focus of the ultrasonic waves generated by the ultrasonic wave generating unit in a circle on the same plane by receiving a transmission of rotational force of the rotating motor. The device enables the focus of ultrasonic waves to be moved in the circle having a constant radius at a uniform depth under the skin, and energy to be applied uniformly and evenly within the movement radius, for enhancement of therapeutic performance.

SUMMARY OF THE INVENTION

In accordance with one aspect of the present invention, there is thus provided a system for ultrasound treatment. The system includes an ultrasound device and a measurement assembly. The ultrasound device includes at least one tilting ultrasound transducer, including a body interface implement, the tilting ultrasound transducer configured to be deployed and transmit ultrasound energy onto a skin tissue overlying a treatment region of an internal tissue of a treated body part, such that the body interface implement interfaces with a surface of the skin tissue. The ultrasound device further includes a motor-driven oscillator, coupled with the tilting ultrasound transducer, and configured to oscillate about an oscillation-axis relative to a surface of the skin tissue, such that at least one of: a position of the body interface implement; and a tilt direction of the body interface implement, oscillates about the oscillation-axis. The measurement assembly is configured for measuring body shape parameters of the treated body part with the ultrasound device. The measurement assembly includes: a green screen; a plurality of scale-markers; at least one imaging device; and a processor. The scale markers are positioned at a predetermined respective distance from each other to form a one-dimensional or two-dimensional plane parallel to the green screen, where the one-dimensional or two-dimensional plane is shared by the treated body part. The imaging device is operational for capturing images of the treated body part and the scale-markers on a background of the green screen. The processor is configured to receive the images from the imaging device and to process the images to measure body shape parameters of the treated body part. The oscillator may be configured to oscillate a propagation direction of the ultrasound energy by dynamically changing a transmittal direction of ultrasound waves relative to the body interface implement. The ultrasound device may include a plurality of ultrasound transducers, and the oscillator may be configured to oscillate a propagation direction of the ultrasound energy by sequentially activating and deactivating respective ones of the ultrasound transducers according to a sequence pattern. The body interface implement may be configured to be tilted with respect to the surface of the skin tissue, forming a non-straight tilting transducer angle between an axis parallel to the body interface implement and an axis parallel to the skin surface, and the oscillator may be configured to oscillate so as to dynamically change the tilting transducer angle, while the body interface implement massages the skin tissue. The ultrasound device may be configured to be maneuvered over the skin tissue along at least one trajectory. The ultrasound device may further include a distal engagement ring, encompassing the tilting ultrasound transducer and configured to be selectively extended distally to engage the skin tissue, so as to stabilize the ultrasound device when the tilting ultrasound transducer is activated. The body interface implement may be configured to be tilted with respect to the surface of the skin tissue, forming a tilting transducer angle in the range of 0.5°-30° between an axis parallel to the body interface implement and an axis parallel to the surface of the skin tissue. The ultrasound device may further include a plurality of electrodes configured to apply interferential electrical stimulation to the skin tissue during operation of the tilting ultrasound transducer. The ultrasound device may further include at least one suction unit configured to apply vacuum suction to the skin tissue during operation of the tilting ultrasound transducer. The ultrasound device may include at least one stabilizing arm coupled with a main body of the ultrasound device, for stably positioning and facilitating maneuvering of the ultrasound device. The ultrasound device may further include at least one non-tilting ultrasound transducer, configured to be deployed onto the skin tissue and transmitting ultrasound energy. The ultrasound device may include a plurality of ultrasound transducers, and the oscillator may be configured to coordinate oscillation of a plurality of the tilting ultrasound transducers to create an interference pattern in the internal tissue.

In accordance with another aspect of the present invention, there is thus provided a method for ultrasound treatment. The method includes the procedure of deploying at least one tilting ultrasound transducer of an ultrasound device onto a skin tissue overlying a treatment region of an internal tissue of a treated body part, the tilting ultrasound transducer including a body interface implement. The method further includes the procedure of inducing the tilting ultrasound transducer to transmit ultrasound energy onto the skin tissue, such that the body interface implement interfaces with a surface of the skin tissue. The method further includes the procedure of oscillating a motor-driven oscillator, coupled with the tilting ultrasound transducer, about an oscillation-axis relative to a surface of the skin tissue, such that at least one of: a position of the body interface implement; and a tilt direction of the body interface implement, oscillates about the oscillation-axis. The method further includes the procedure of measuring body shape parameters of the treated body part, by: positioning the treated body part in front of a green screen of a measurement assembly; positioning a plurality of scale-markers of the measurement assembly at a predetermined respective distance from each other to form a one-dimensional or two-dimensional plane parallel to the green screen, wherein the one-dimensional or two-dimensional plane is shared by the treated body part; capturing images of the treated body part and the scale-markers on a background of the green screen, with at least one imaging device of the measurement assembly; and processing the images to measure body shape parameters of the treated body part. The oscillating of the oscillator may be configured to oscillate a propagation direction of the ultrasound energy by dynamically changing a transmittal direction of ultrasound waves relative to the body interface implement. The ultrasound device may include a plurality of ultrasound transducers, and the oscillating of the oscillator may be configured to oscillate a propagation direction of the ultrasound energy by sequentially activating and deactivating respective ones of the ultrasound transducers according to a sequence pattern. The body interface implement may be configured to be tilted with respect to the surface of the skin tissue, forming a non-straight tilting transducer angle between an axis parallel to the body interface implement and an axis parallel to the skin surface, and the oscillating of the oscillator may be configured to dynamically change the tilting transducer angle, while the body interface implement massages the skin tissue. The method may further include the procedure of maneuvering the ultrasound device over the skin tissue along at least one trajectory. The method may further include the procedure of selectively extending a distal engagement ring, encompassing the tilting ultrasound transducer, distally to engage the skin tissue, so as to stabilize the ultrasound device when the tilting ultrasound transducer is activated. The body interface implement may be configured to be tilted with respect to the surface of the skin tissue, forming a tilting transducer angle in the range of 0.5°-30° between an axis parallel to the body interface implement and an axis parallel to the surface of the skin tissue. The method may further include the procedure of applying interferential electrical stimulation to the skin tissue, using a plurality of electrodes, during operation of the tilting ultrasound transducer. The method may further include the procedure of applying a vacuum suction to the skin tissue, using at least one suction unit, during operation of the tilting ultrasound transducer. The method may further include the procedure of deploying at least one non-tilting ultrasound transducer onto the skin tissue and inducing the non-tilting ultrasound transducer to transmit ultrasound energy. The method may further include the procedure of coordinating the oscillation of a plurality of tilting ultrasound transducers to create an interference pattern in the internal tissue. The method may further include the procedure of oscillating an integrated transducer unit formed by a plurality of tilting ultrasound transducers, such that each of the transducers moves correspondingly with the oscillation of the integrated transducer unit.

BRIEF DESCRIPTION OF THE DRAWINGS

The present invention will be understood and appreciated more fully from the following detailed description taken in conjunction with the drawings in which:

FIG. 4 is an overhead view illustration of a trajectory along which an ultrasound device is maneuvered over a skin tissue, operative in accordance with an embodiment of the present invention;

DETAILED DESCRIPTION OF THE EMBODIMENTS

The present invention overcomes the disadvantages of the prior art by providing an ultrasound device and method for effectively conveying therapeutic or aesthetic ultrasound and massage treatment to a treated internal tissue of a patient, over prolonged treatment sessions, without harming external tissue layers. The device includes an oscillator and at least one ultrasound transducer. The transducer is operational to tiltingly rotate at a non-straight (i.e., non-180°) angle against the skin tissue of the patient, while the main body is stabilized at the skin tissue, and to direct non-focused ultrasound energy to a treatment region of the internal tissue underlying the skin tissue.

The terms "user" and "operator" are used interchangeably herein to refer to any individual person or group of persons using or operating the method or system of the present invention, such as a physiotherapist or medical practitioner certified to perform therapeutic and/or aesthetic ultrasound procedures.

The term "patient" is used herein to refer to a person on whom the method or system of the present invention is operated, such as a person undergoing a therapeutic or aesthetic ultrasound procedure.

The term "simultaneous", and any variations thereof, as used herein, also encompasses a period of time before, and a period of time after, the duration under consideration. Accordingly, a first procedure that is described as being performed "simultaneously" to a second procedure, may be performed, e.g., immediately before, immediately after, and/or during the second procedure.

The phrase "component/element X is perpendicular to surface B" as used herein, refers to a substantially 90° angle between an axis which is substantially parallel to surface B and an extended portion of component X which is adjacent to surface B and vertically extends therefrom/thereinto. Correspondingly, the term "non-perpendicular" as used herein refers to an angle which is not 90° (although is often within a near range of 90°, e.g., 80°, 95°, etc.) between component X and surface B, for example the angle of tilted ultrasound waves propagating through the surface of the skin tissue.

The term "non-straight angle" as used herein refers either to an angle between two touching or nearly touching substantially flat surfaces which is not 180°, e.g., between the distal surface of a transducer and the skin surface.

Figure 1A:
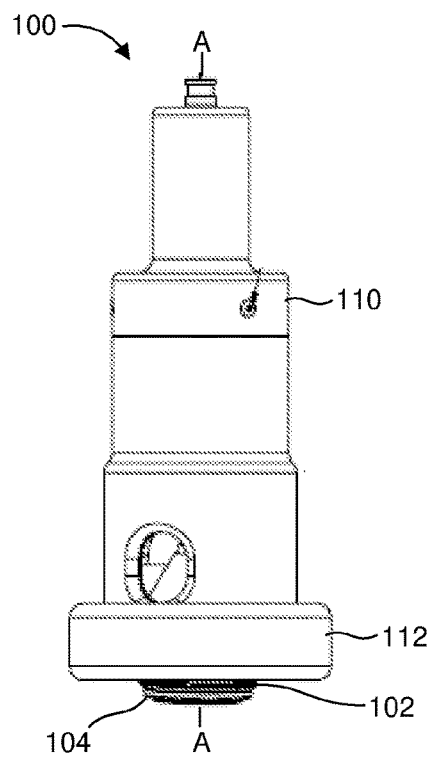
FIG. 1A is an illustration of an ultrasound device, constructed and operative according to an embodiment of the present invention.
Figure 1B:
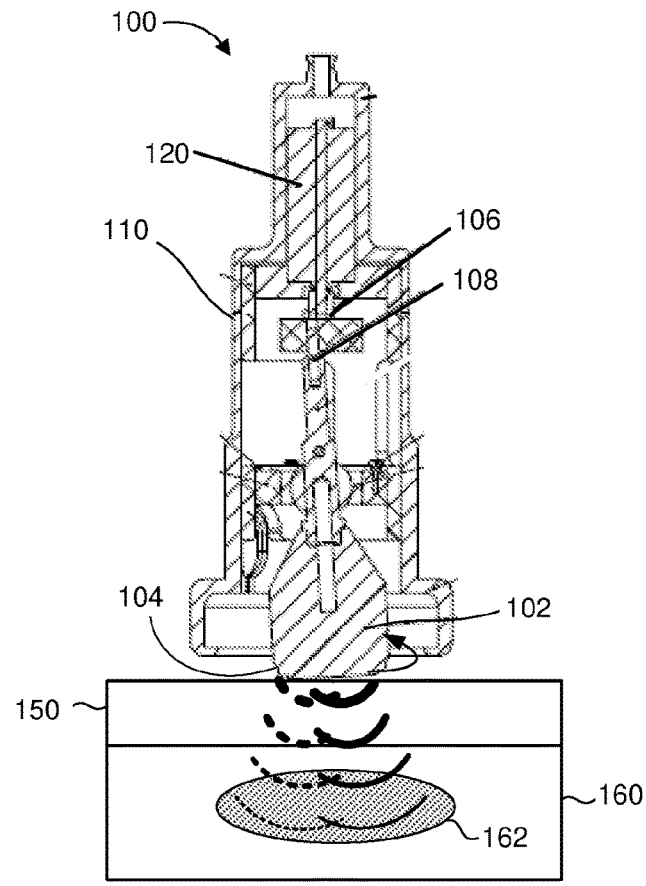
FIG. 1B is a cross-sectional illustration of the ultrasound device of FIG. 1A.

Reference is now made to FIG. 1A, which is an illustration of an ultrasound device, generally referenced 100, constructed and operative in accordance with an embodiment of the present invention. Reference is also made to FIG. 1B which is a cross-sectional illustration of ultrasound device 100 of FIG. 1A, taken along a line denoted A-A. Ultrasound device 100 includes a main body 110, a tilting ultrasound transducer 102, a body interface implement 104, an oscillator 106, a motor 120, and an engagement ring 112. Device 100 is defined as having a distal end and a proximal end, where the distal end faces away from a user (not shown) holding device 100 and is directed towards the body of a patient (not shown), where the distal end is depicted on the bottom of device 100 in FIGS. 1A and 1B. Main body 110 is disposed at the proximal end of device 100. Tilting ultrasound transducer 102 is positioned at the distal end of main body 110, adjacent to a skin tissue 150 of a patient. Body interfacing implement 104 is a distal component of transducer 102 which interfaces with the treated body part of the patient and through which the ultrasound energy is transmitted. Oscillator 106 is situated inside main body 110 and is coupled with transducer 102 via a coupling pin 108. Motor 120 is also situated within main body 110 proximally to oscillator 106 and is electrically coupled with oscillator 106. Engagement ring 112 is disposed at the distal end of main body 110 proximally to transducer 102, and radially encircles main body 110 (i.e., about the radial axis). Motor 120 and ring 112 may be considered optional components.

A treated body part of the patient, e.g., an arm, includes an external skin tissue 150 and an internal tissue 160. Skin tissue 150 refers to an outer surface of the patient body which comes in direct contact with transducer 102 during the operation of device 100, and may include one or more skin tissue layers (e.g., epidermis, dermis, and hypodermis). Internal tissue 160 may include any tissue substantially underlying skin tissue 150 which is intended to be energized and treated by transmitted ultrasound waves, including but not limited to: subcutaneous fat tissue (i.e., adipose tissue); muscle tissue; connective tissue, such as ligaments, tendons and bone tissue; and internal organs, e.g., lungs, kidneys, female fertility organs, and the like. Treatment region 162 refers to an approximate region, usually within internal tissue 160, which is regarded to require treatment, and towards which the treatment of device 100 is directed. It is noted that treatment region 162 may be part of a unified collection of tissues adapted for performing a common physiological function, such as a tissue that forms part of an internal organ. Non-limiting examples of types of treatment in which device 100 may be applied include all types of physiotherapeutic treatments, such as treatment of carpal tunnel syndrome, frozen shoulder, tendonitis, ligament injuries, joint tightness, and treatment of internal organs, and various types of aesthetic treatments, such as body sculpting or body contouring processes, face lifting, wrinkle reduction, face and neck skin tightening, and the like. The terms physiotherapy and physiotherapeutic treatment is generally used herein to include all types of medical treatments.

Main body 110 generally has an elongated shape, allowing main body 110 to be comfortably gripped by an operator and manually maneuvered to roam over skin tissue 150 of a treated body part. Transducer 102 contacts skin tissue 150 at a tilted or inclined angle and transmits ultrasound waves toward internal tissue 160 underlying skin tissue 150. Oscillator 106 rotates transducer 102 against skin tissue 150 such that transducer 102 moves in a substantially circular motion at skin tissue 150. Motor 120 powers the rotation of oscillator 106 and the ultrasound transmission of transducer 102. Engagement ring 112 is operational to be selectively extended towards skin tissue 150 and retracted therefrom, as needed.

The operation of ultrasound device 100 will now be described in general terms, followed by specific examples.

Figure 1C:
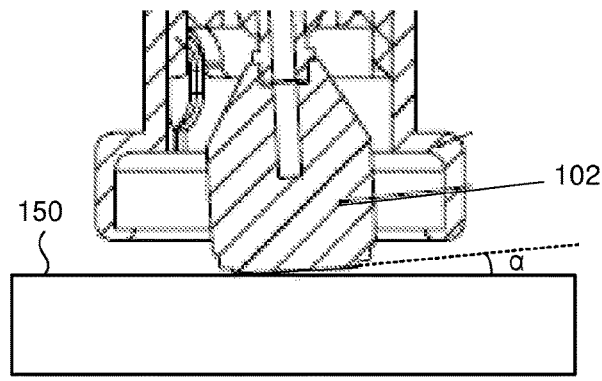
FIG. 1C is an enlarged cross-sectional illustration of a distal portion of the ultrasound device of FIG. 1B.

When activated, transducer 102 tiltingly rotates at skin tissue 150, continuously pushing against the surface of skin tissue 150 at an inclined angle relative to an axis running parallel to the skin surface. Referring also to FIG. 1C, transducer 102 is shaped and/or positioned so as to be in contact with skin tissue 150 at a non-straight angle. An axis parallel to body interface implement 104 forms an angle, designated "α", with an axis parallel to the surface of skin tissue 150. Body interface implement 104 may have a substantially flat panel-like shape, or may have another surface shape, such as a convex shape, a wave-like shape, etc. When the shape of the body interface implement is not uniformly flat, the angle α may be defined between the tangent to the central portion of the body interface implement and the skin surface. The angle α may be in the range of 0.5°-30°. In some embodiments of the invention the angle α may be in a sub-range of the above range, such as: the range of 1°-20°; the range of 1.5°-15; and the range of 2°-5°. An exemplary angle α is at 3.5°. Transducer 102 is operated to transmit ultrasound waves 122 while continuously tiltingly rotating in an inclined circular formation. The tilted circular movement pattern of transducer 102 may produce a cyclic-like propagation pattern of the ultrasound waves within the skin tissue. The cyclic propagation pattern may be conically shaped, optionally in a divergent cone shape, such that the narrow end of the cone is created by the ultrasound waves transmitted by transducer 102 at the connection between transducer 102 and skin tissue 150, and the widening end of the cone is created by the propagation of the ultrasound waves within the underlying internal tissue 160. Alternatively, the conical shape may be of a convergent cone, such that the wide end of the cone is created by the ultrasound waves produced by transducer 102 at external skin tissue 150, and the narrowing end is created by the propagation of the ultrasound waves within the underlying internal tissue 160, as will be further described herein with relation to FIGS. 1F and 1G. Any intermediate conical shapes may also be produced by a movement pattern of transducer 102.

Although the described movement pattern of transducer 102 is in a circular formation, transducer 102 may be alternatively oscillated in diverse movement patterns, such as: a side-to-side pattern, a back-and-forth pattern, a "number 8" formation, or any combination thereof. Therefore, the term "rotate", and grammatical variations thereof, as used herein is to be interpreted broadly to encompass various systematic movement patterns, including circular and non-circular movement patterns. At least one of: the location/position of the ultrasound transducer upon the surface of skin tissue 150 relative to the treated tissue; the magnitude of angle α between the body interface implement of the ultrasound transducer and the skin surface; and the direction toward which angle α is facing, relative to the true north or relative to the patient's body, may dynamically vary during an oscillation cycle of the ultrasound transducer.

For example, when an oscillation pattern of an ultrasound transducer (or of the body interface implement thereof) is a side-to-side tilting, the transducer starts the oscillation cycle in a position at which the angle (α) is at a maximal magnitude (in relation to this particular oscillation pattern) and is facing in a first direction relative to the body of the patient (and/or relative to the true north). During the oscillation cycle, the transducer tilts such that the angle (α) transfers from facing in the first direction to facing in a second opposite direction, optionally such that the angle (α) reaches substantially the same maximal magnitude while facing in the opposite direction. The trajectory of the transducer may be a substantially two-dimensional (2D) convex trajectory relative to the treated tissue, such that when the transducer is tilting from the maximal angle/tilt on one side to the maximal tilt/angle on the opposite side, the magnitude of the angle (α) may gradually decrease until the body interface implement of the transducer is in a substantially straight angle relative to the skin surface, and then may gradually increase until reaching a maximal angle facing in the opposite direction, and so on moving back and forth.

It is noted that the angled propagation pattern of the ultrasound waves within the tissue, as produced by transducer 102, may optionally be created independently of a tilting movement of the ultrasound transducer, optionally by a non-tilting, i.e., straight-angled, ultrasound transducer. In this embodiment, the oscillator may function as a controller, activating and de-activating various transducers or sections of transducers according to a sequential oscillation pattern. For example, the ultrasound waves may be transmitted from different sections of the transducer (i.e., partial groups of the piezoelectric elements) in a phased array, causing the ultrasound waves to propagate at an angled tilt relative to the tangent of the body interface panel. Alternatively, particularly when the body interface panel is not flat, the ultrasound waves may be transmitted from different sections of the transducer, in any sequential order, where the diverse angles of the different sections of the body interface panel cause the ultrasound energy to be transmitted, and to propagate within the treated tissue, at respective diverse angles. According to a similar principle, though producing a somewhat opposite effect, the oscillator may be operational to continuously oscillate the ultrasound transducer (i.e., the body interface implement) at/against the skin tissue, such that the angle between the transducer and the surface of the skin tissue is continuously changing (as explained above with relation to transducer 102), and at the same time the oscillator may also continuously alter the sections of the transducer from which the energy is transmitted, such that despite the tilted oscillating of the transducer, the propagation direction of the ultrasound energy may remain substantially unchanged. Any other combination between oscillation of the direction at which the ultrasound energy is transmitted from the transducer, and oscillation of the angle and/or position of the transducer relative to the skin tissue, may be applied. Different oscillation patterns and combinations may be utilized interchangeably during a single treatment session. Additionally, oscillation of ultrasound waves at skin tissue 150 may be achieved without oscillating an ultrasound transducer along a trajectory or oscillating the transmittal pattern of the ultrasound waves, for example by positioning a plurality of ultrasound transducers at predetermined respective locations on a section of the skin tissue, and/or at predetermined angled tilts relative to the skin tissue, and oscillating the transmitted ultrasound energy by independently activating and de-activating each of the plurality of transducers according to a predefined sequence pattern, controlled and regulated by the oscillator. The alternating activation of the plurality of transducers may be of each transducer in turn, synchronized activating of pairs of opposing transducers, or in any other sequence pattern.

Therefore, where trajectories and movement/propagation patterns of a transducer head and/or of ultrasound waves is described herein, the option of producing a corresponding effect using alternative methods is encompassed, including utilizing a plurality of stationary ultrasound transducers, transmitting ultrasound waves from partial sections of the ultrasound transducer, or others method known in the art for manipulating ultrasound waves.

The oscillation at a tilted angle of transducer 102 produces a massaging effect at skin tissue 150, which may improve blood flow and circulation of the lymph system in the underlying internal tissue 160. This tilting oscillation may make it difficult to maintain transducer 102 in a desirable position and in close contact with skin tissue 150, in order to effectively deliver energy to the underlying internal tissue 160. Main body 110 may therefore be shaped and sized so as to facilitate its stabilized positioning at skin tissue 150 by an operator, and so by extension to stabilize the activated transducer 102 and maintain the position of transducer 102 at skin tissue 150 while tiltingly rotating. The shape of main body 110 may include, for example, an elongated shape or a spherical shape, and may include a protruding handle, and/or any other element or feature which allows an operator to maintain main body 110 at a substantially fixed and steady alignment relative to the surface of skin tissue 150. In one embodiment of the invention, main body 110 may be aligned substantially perpendicular to skin tissue 150, i.e., such that the angle between the longitudinal axis of the main body 110, and an axis parallel to skin tissue 150, is substantially 90°. However, the alignment of main body 110 relative to skin tissue 150 may vary, and may include, for example, a straight angle, a 45° angle, and/or may be adjustable according to the body part needed to be treated.

Figure 1E:
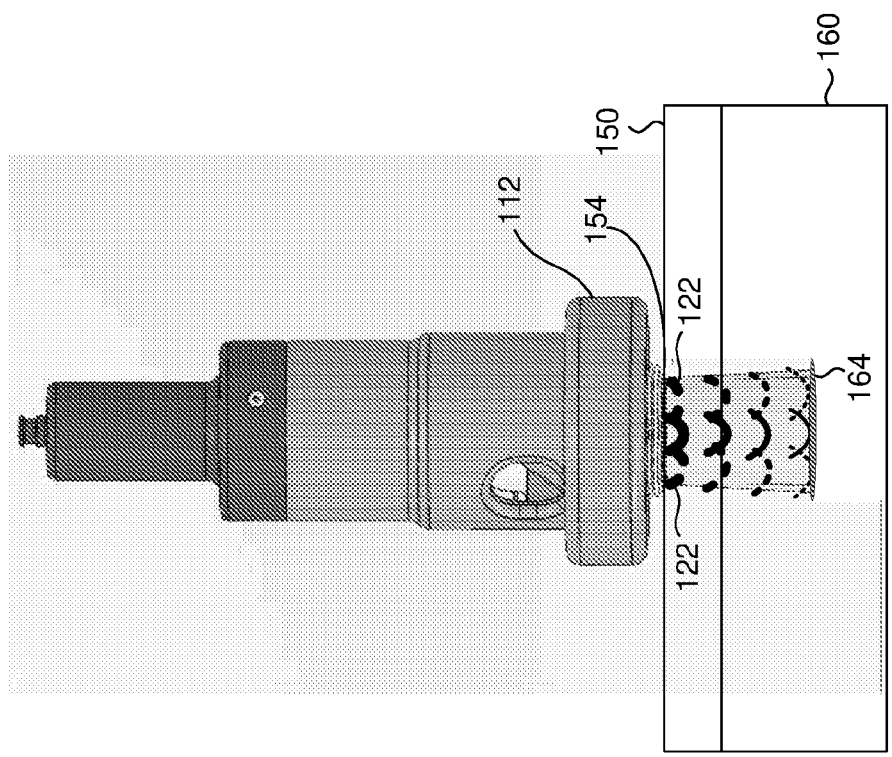
FIG. 1E is an illustration of the ultrasound device of FIG. 1A and an energized area of a body part which receives ultrasound energy transmitted by the device.
Figure 1D:
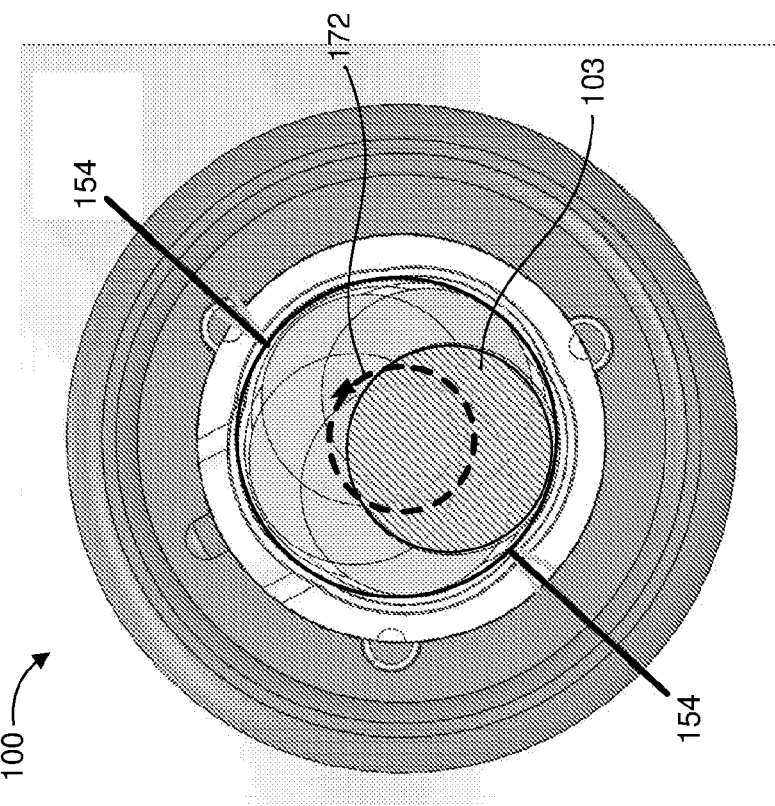
FIG. 1D is an illustration of the ultrasound device of FIG. 1A, shown from its distal end.

Reference is now also made to FIG. 1D, which is an illustration of device 100 shown from its distal end, depicting a movement pattern of the tilting rotation of transducer 102. Reference is also made to FIG. 1E, which is an illustration of device 100 and an energized area of the body part, which receives ultrasound energy transmitted by transducer 102. Transducer 102 tiltingly rotates along movement pattern 172 at skin tissue 150. The angle α between transducer 102 and skin tissue 150 (shown in FIG. 1C), and the rotation of transducer 102, cause the distal surface of transducer 102, referenced herein as transducer surface 103, to continuously and successively travel over a section of skin tissue 150, referenced herein as transducer contact section 154. Transducer contact section 154 includes an area of skin tissue 150 with which transducer surface 103 makes contact in a full rotation/oscillation cycle, when device 100 is stationary. The area of transducer contact section 154 is therefore larger than the area of transducer surface 103. The area of transducer contact section 154 is usually in direct proportion to angle α, i.e., a larger angle α between transducer 102 and skin tissue 150 will usually produce a larger area of transducer contact section 154. However, the shape and area of transducer contact section 154 are also dependent upon the general shape of transducer 102 and the movement pattern of transducer 102 at skin tissue 150.

Transducer 102 transmits non-focused ultrasound waves 122 while tiltingly oscillating, to be directed in a continuous sweeping pattern toward an internal tissue section 164 of internal tissue 160, underlying transducer contact section 154 of skin tissue 150. The frequency of the ultrasound waves transmitted by at least one transducer 102 may be in the range of 0.5-4.5 MHz, and the ultrasound intensity may be in the range of 0.1-3.5 W/cm². Mainly due to the angled direction at which ultrasound waves 122 are transmitted, internal tissue section 164 is of broader scope than section 154 against which transducer 102 is rotating, i.e., transducer 102 delivers energy to a broad area of internal tissue 160, the periphery of which does not necessarily lie directly beneath its point of contact with skin tissue 150. This is also partially due to the divergence of ultrasound waves 122 as they penetrate deeper into the tissue.

For example, when the radius of transducer 102 is approximately $R_{(transducer)}$=2 cm, transducer 102 is tilted at angle α=3.5°, and transducer 102 rotates in a substantially circular pattern against skin tissue 150, the resultant underlying internal tissue section 164, at a depth of about 5 cm beneath the surface of skin tissue 150, has a radius of about $R_{(deep\ section)}$=3 cm. In other words, the area of internal tissue section 164 which is energized by transducer 102, is more than twice as large as the area of transducer surface 103.

The tilting movement pattern of transducer 102, which causes an increase of radius/area of transducer contact section 154 relative to transducer 102, and of internal tissue section 164 relative to transducer contact section 154, may allow increased delivery of ultrasound energy to the internal tissue (160) while reducing the exposure of external skin tissue 150 to high energy ultrasound, as compared with a straight-angled (i.e., non-tilted) ultrasound transducer. Throughout the tilting rotation of transducer 102, the region of external skin tissue 150 with which transducer 102 is making direct contact, within the transducer contact section 154, is continuously altered (as is evident from the area of section 154 being larger than the area of transducer 102). This helps prevent prolonged exposure of any one portion of external skin tissue 150 to high frequency ultrasound while ultrasound device 100 is stationary at a particular location of external skin tissue 150, allowing ultrasound device 100 to remain at that particular location for longer than would be possible with a parallel ultrasound transducer while avoiding damage to the external skin tissue. Ultrasound device 100 remaining stationary at a particular location for a longer time period may provide increased energizing of the underlying internal tissue section 164, which may enhance the effectiveness of the ultrasound treatment. Furthermore, as internal tissue section 164 has a relatively large area compared to transducer contact section 154, when device 100 (including transducer 102) is advanced from a first particular location to a following adjacent location of external skin tissue 150, at least part of a first internal tissue section 164, which underlies the first particular location, will continue to receive ultrasound energy when device 100 is positioned in the following adjacent location (i.e., a following internal tissue section 164, which underlies the following adjacent location of device 100, will partially overlap with the first internal tissue section 164) further enhancing the energizing of internal tissue 160.

From another perspective, the angled tilting of ultrasound transducer 102 may also enhance the massaging effect produced by the transducer, by applying a deeper and more diverse physical massage to skin tissue 150, as compared with a massage applied by a transducer that rotates flatly against the skin tissue. The shifting angle of ultrasound transducer 102 may cause transducer 102 to contact different portions of the skin tissue against which it is rotating and at varying angles, and the angular inclination of transducer 102 may cause transducer 102 to press more deeply against skin tissue 150, particularly at the distal end of the tilting transducer 102.

It is noted that some possible benefits of internal tissue section 164 having a larger area than transducer contact section 154 have been described above. However, a larger section 164 may be the case only in some rotation patterns of tiltingly rotatable ultrasound transducer 102, while other rotation patterns may have other advantages with regard to effective energy delivery to the internal tissue. For example, with reference to FIGS. 1F and 1G, an ultrasound transducer 182 of an ultrasound device 180 is tiltingly rotated along a substantially circular trajectory 184, such that in a full cycle of rotation, transducer 182 makes contact with external skin tissue 150 in a skin tissue area designated as a transducer contact ring 194. The center of ring 194 may include a section of skin tissue 150 with which transducer 182 does not contact when ultrasound device 180 is stationary at a particular location. While tiltingly rotating, transducer 182 emits ultrasound waves 192 toward an underlying internal tissue. Due to its angular tilt and rotation pattern, transducer 182 contacts a given portion of external skin tissue 150 only once during a respective full rotation cycle, and ultrasound waves 192 energize a relatively concentrated internal tissue section 196 (e.g., which may have a smaller total area than transducer contact ring 194). A large area of contact ring 194 allows for prolonging the duration for which ultrasound device 180 is maintained, i.e., substantially stationary, at a particular location of skin tissue 150, while substantially reducing risk of damage to external skin tissue 150. In particular, a given portion of skin tissue 150 receives direct ultrasound energy from transducer 182 and then undergoes an intermission period during which it is not subject to direct energy for the remainder of the rotation cycle of transducer 182, before receiving another energy dosage. The effectivity of ultrasound treatment generally depends upon a sufficient quantity and/or duration of energizing of the internal tissue, where these parameters are often compromised by the need to shift the location of the transducer to avoid damaging the external skin tissue. Prolonging the ultrasound device 180 at a single location, while also reducing risk of damage, together with a relatively concentrated internal tissue section 196 of ultrasound waves 192, may increase the duration of time and the amount of energy being delivered to the internal tissue, and may therefore enhance the effectivity of the energizing of the internal tissue.

As exemplified in the above (FIGS. 1A-1G), an ultrasound device may display a variety of angular tilts and oscillation patterns of the ultrasound transducer(s), each of which may be individually advantageous for effectively energizing a body tissue. A common feature of such tilts and patterns is that the ultrasound transducer transmits ultrasound energy at a non-perpendicular angle relative to the skin tissue in a least a part of the oscillation cycle (although the transmitted ultrasound may be perpendicular to the skin tissue in portions of the oscillation pattern), and that the direction, angle, and/or position at which the ultrasound is transmitted and propagates within the skin tissue is oscillated.

Referring back to FIGS. 1A and 1B, oscillator 106 is operational to rotate in a plane which is substantially parallel to skin tissue 150, and oscillator 106 is coupled with transducer 102 such that the parallel rotation of oscillator 106 initiates the tilting rotation of transducer 102. Oscillator 106 may be directly attached to transducer 102, or may be coupled through a coupling element, e.g., coupling pin 108. For example, coupling pin 108 may be linearly continuous to the proximal end of transducer 102 and may be attached to an outer circumference of oscillator 106, so as to form a relative angle between transducer 102 and oscillator 106.

The rotation of transducer 102 is powered, via oscillator 106, by motor 120, but may alternatively be powered by an alternative powering mechanism, such as a mechanical mechanism (e.g., a winding spring), or manually by an operator. The ultrasound transmission of transducer 102 may also be activated by motor 120 or activated by a separate motor (not shown).

Engagement ring 112, which encompasses transducer 102, is operational to be selectively extended in a distal direction toward skin tissue 150 during the operation of transducer 102, such that ring 112 tightly engages skin tissue 150 in close perpendicular contact, while transducer 102 tiltingly rotates in an inclined circular formation against transducer contact section 154 of skin tissue 150, enclosed by ring 112. A tight engagement of ring 112 with skin tissue 150 may help stabilize the positioning of device 100 upon skin tissue 150 and allow transducer 102 to maintain close contact with skin tissue 150 despite the tilting rotation thereof. In the disclosed embodiment depicted in FIGS. 1A-1C transducer 102 is substantially aligned with main body 110, however transducer 102 may alternatively be positioned elsewhere in the vicinity of main body 110 and coupled thereto.

Treatment with ultrasound device 100 may be administered by an operator who grasps main body 110 and manually maneuvers device 100 over skin tissue 150, for effectively energizing a broad portion of an internal tissue 160 surrounding a treatment region 162 of the treated body part. In conducted experiments it has been found that the effectivity of treatments administered with existing rotatable ultrasound devices known in the art, where the rotating transducer is parallel to the skin tissue, were significantly more effective when the operator had been trained to manually tiltingly maneuver the device against the skin tissue of the patient, particularly rotating the device in an inclined circular formation. However, training an operator to tiltingly rotate the ultrasound transducer during treatment so as to achieve a desired effect requires considerable training time, such as a full month of training. Moreover, it is a physically demanding procedure and operators are usually unable to administer this type of treatment for the duration of a full treatment session, let alone for an entire day of therapy. Accordingly, the ultrasound device of the present invention, which is configured for tiltingly rotating the ultrasound transducer during treatment, may substantially minimize the skill and effort required by an operator, and has been found to be substantially advantageous over existing ultrasound treatment devices, producing measurable therapeutic/aesthetic results from the very first treatment session, even when performed by an unexperienced operator. The tilted oscillation pattern of transducer 102 may induce an altering stimulation to different layers of skin tissue, due to the continuously changing angle at which the ultrasound is being transmitted into the skin tissue, as compared to a substantially fixed stimulation by a transducer which rotates flatly against skin tissue. Such an altering stimulation may restrict, slow or prevent a rise in skin impedance which usually results from continuous ultrasound stimulation, the rise in impedance often causing the ultrasound waves to propagate less effectively within the skin tissue and reduced effectivity. Minimizing a rise in skin impedance may enhance the energy delivery to internal tissue 160 by transducer 102, which may result in a more effective treatment.

Figure 2:
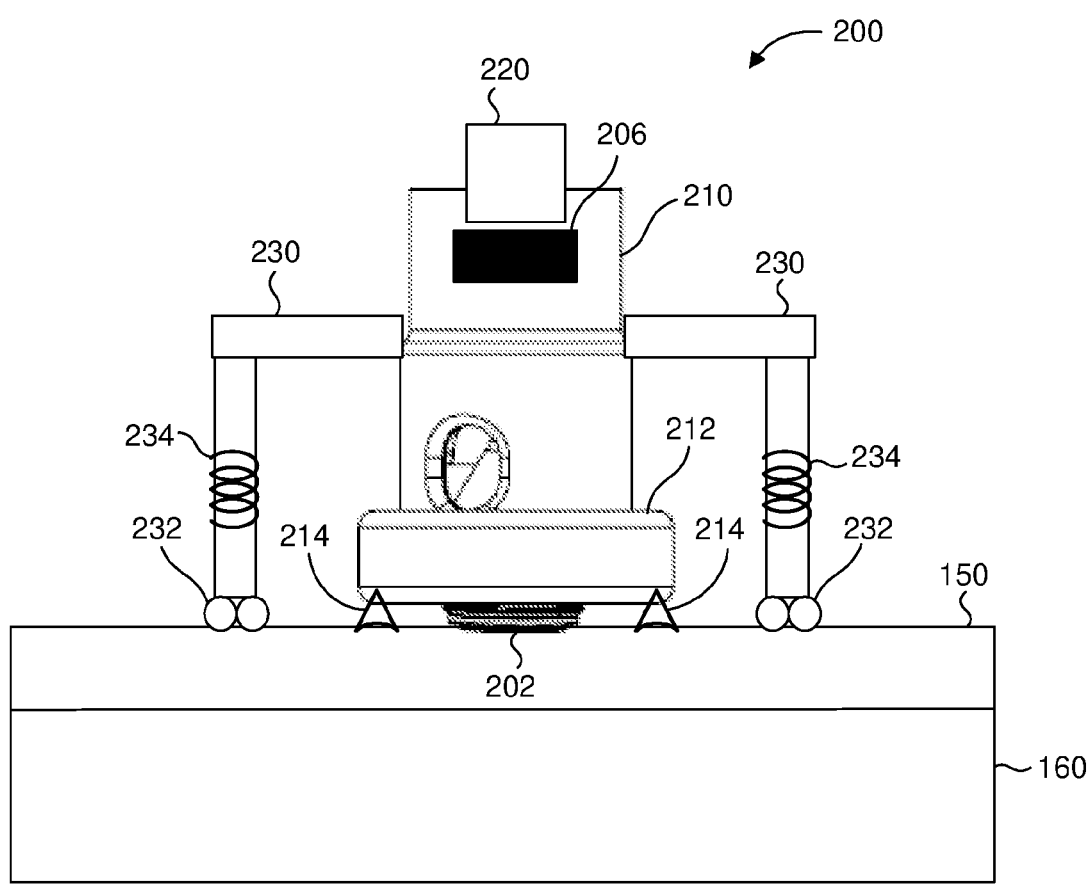
FIG. 2 is an illustration of an ultrasound device including stabilizing arms, constructed and operative according to an embodiment of the present invention.

An ultrasound device of the present invention may be configured to be attached to the skin tissue of the patient, obviating the need for an operator to constantly hold the device in position. Reference is now made to FIG. 2, which is an illustration of an ultrasound device, referenced 200, including stabilizing arms, constructed and operative according to an embodiment of the present invention. Ultrasound device 200 includes an ultrasound transducer 202 and an oscillator 206. Ultrasound device 200 is fixedly coupled to skin tissue 150 via stabilizing arms 230. Each of stabilizing arms 230 is "L-shaped", such that a short "L-segment" of each stabilizing arm 230 is coupled at a proximal end with main body 210 of device 200, and a long L-segment of each stabilizing arm 230 is coupled at a distal end with skin tissue 150. Adjustment springs 234 are disposed within the long "L-segment" of each stabilizing arm 230. Engagement ring 212 encompassing ultrasound transducer 202 is coupled with a plurality of suction units 214 at the distal end of ring 212. Distal transporters 232 are coupled to a distal end of respective stabilizing arms 230 and configured to provide automatic maneuvering of ultrasound device 200.

Stabilizing arms 230 are operational to stably position and/or couple ultrasound device 200 to skin tissue 150. Arms 230 may be composed of a rigid material (such as metal or plastic), and may include an adjustment mechanism, such as springs 234, for adjusting the length of stabilizing arms 230 and/or the position of arms 230 in relation to main body 210 and/or skin tissue 150, when device 200 is maneuvered over skin tissue 150. Particularly, when device 200 is applied over an uneven non-uniform skin tissue, such as the circumference of an arm, springs 234 may compress and decompress according to the changing skin surface. This may facilitate maintaining stability of arms 230 upon skin tissue 150, and by extension, maintaining stability of main body 210 while traversing an uneven surface of skin tissue 150. Device 200 may include one or more stabilizing arms 230, such that a plurality of arms 230 may be distributed around the circumference of main body 210 at substantially equal distances, or in an alternative distribution configured for balancing and stabilizing main body 210 on skin tissue 150. For example, device 200 may include two stabilizing arms 230 positioned at opposing sides of main body 210. The positioning of arms 230 may be adjustable. For example, a proximal end of arms 230 may be affixed into a groove (not shown) bored along a circumference of main body 210, such that the proximal end of arms 230 can be maneuvered inside the groove to adjust the position of arms 230 relative to main body 210.

The stability provided by arms 230 to main body 210 may allow for coupling and automatically maneuvering device 200 over skin tissue 150 without need for an operator. Distal transporters 232 may be coupled to arms 230 and may be motor-powered to facilitate advancement of device 200 over skin tissue 150. The trajectory of device 200 over skin tissue 150 via transporters 232 may be remotely controlled by an operator, or may be predefined. Distal transporters 232 may include wheels, tracks, or other transporting means. Transporters 232 may be coupled to stabilizing arms 230, main body 210, and/or to another portion of device 200. When maneuvering ultrasound device it may be challenging for an operator to constantly maintain the device at a precise pressure against skin tissue 150 and to advance the device at a precise advancement rate along skin tissue 150, for effective delivery of ultrasound energy while avoiding tissue damage, particularly for prolonged treatment periods. Accordingly, affixing device 200 to external skin tissue 150 using arms 230 and automatically maneuvering device 200 over skin tissue 150 using transporters 232 may be particularly advantageous in maintaining an optimal pressure and advancement rate of transducer 202.

Suction units 214 are operational to apply a suction force to skin tissue 150. Applying vacuum suction onto a tissue as a form of massage may be utilized in addition to a massaging effect conferred by transducer 202. Moreover, suction units 214 may improve the coupling and/or stability of device 200 at the treated body part. Specifically, the activation of at least one suction unit 214 coupled to the distal end of ring 212 may enhance tight engagement of skin tissue 150 by engagement ring 212, so as to fixate ultrasound device 200 onto the treated body part and subsequently stabilize transducer 202 while tiltingly rotating at skin tissue 150. Suction units 214 may alternatively be coupled to stabilizing arms 230, distal transporters 232, main body 210, and/or other portions of device 200. As will be further explained with reference to FIG. 4, during a treatment session of a body part, ultrasound device 200 is usually slowly maneuvered over skin tissue 150. The slow maneuvering of ultrasound device 200 may involve lingering for a brief duration, such as approximately 1-3 seconds, at a selected region of skin tissue 150 before continuing to a next adjacent region, in order to allow effective absorption of ultrasound energy in the internal tissue. At least one suction unit 214 may be activated to apply a suction force upon arrival at a particular location of skin tissue 150, for fixating ultrasound device 200 thereto, and may be deactivated after a brief duration (e.g., 1-3 seconds) so as to decouple from skin tissue 150 and allow for advancing ultrasound device 200 to a subsequent location of skin tissue 150.

In order for transmitted ultrasound waves to reach the internal tissue at an effective energy level, the transducer applied at the skin tissue should transmit ultrasound waves at an energy level substantially higher than the effective energy level. However, such a higher energy level may be harmful to the skin tissue at prolonged exposures. One way to overcome this obstacle is by utilizing the effect of constructive interference. Constructive interference is the combining of multiple ultrasound waves incident at a particular location and in phase, i.e., at their wave energy maxima, so as to produce an amplitude, i.e., energy level, which is the vector sum of the amplitudes of the ultrasound waves. Energizing internal tissue by coordinating the transmittal of ultrasound waves to produce constructive interferences therein, can enable applying lower energy ultrasound at the skin tissue and, as a result, may provide longer and more effective energizing.

Figure 3A:
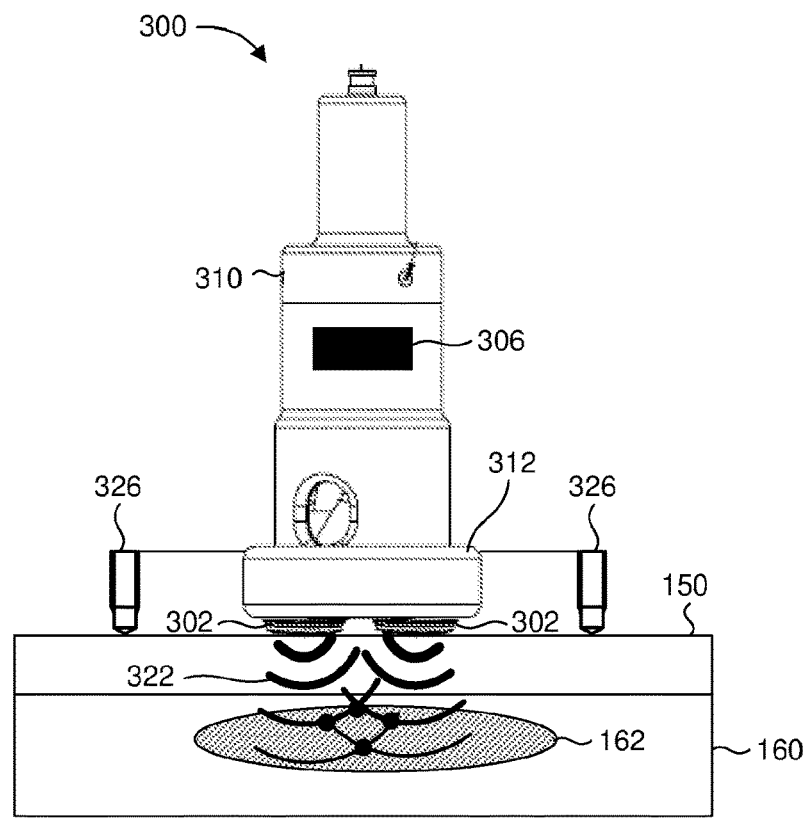
FIG. 3A is an illustration of an ultrasound device including a plurality of tilting ultrasound transducers, constructed and operative in accordance with an embodiment of the present invention.
Figure 3B:
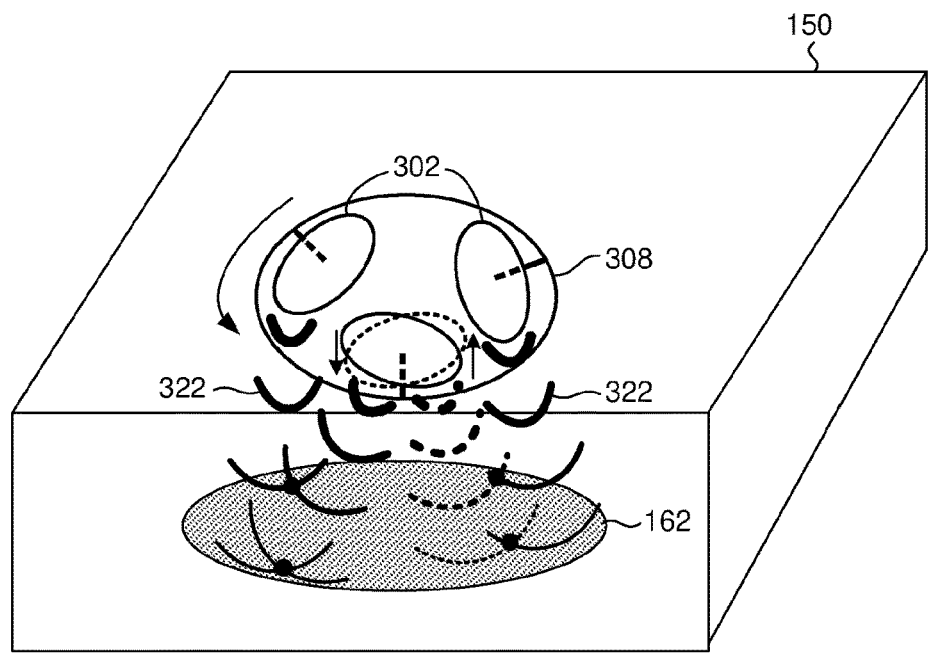
FIG. 3B is an overhead perspective view illustration of the transducers of the ultrasound device of FIG. 3A tiltingly rotating to shift location of constructive interference, constructed and operative in accordance with an embodiment of the present invention.

Reference is made to FIGS. 3A and 3B. FIG. 3A is an illustration of an ultrasound device, generally referenced 300, including a plurality of tilting ultrasound transducers, constructed and operative in accordance with an embodiment of the present invention. FIG. 3B is an overhead perspective view illustration of the transducers of ultrasound device 300 of FIG. 3A tiltingly rotating to shift location of constructive interference, constructed and operative in accordance with an embodiment of the present invention. ultrasound device 300 includes a plurality of tilting ultrasound transducers 302, configured for rotating at skin tissue 150 while transmitting ultrasound energy thereto. Each transducer 302 is coupled with main body 310 of device 300 and is positioned to contact and rotate at skin tissue 150. Engagement ring 312 encompasses transducers 302 and may be selectively extended to forcefully push against skin tissue 150, for stabilizing transducers 302 when rotating. A plurality of electrodes 326 are coupled with device 300 and configured to deliver electrical stimulation to skin tissue 150. Transducers 302 may rotate independently of each other or in a synchronized manner. At least two transducers 302 may be positioned and oriented relative to each other for coordinating the propagation of ultrasound waves 322 transmitted by the transducers 302, to combine and produce a constructive interference within internal tissue 160. Referring to FIG. 3B, angular oscillating of at least one tilting ultrasound transducer 302 may shift the location of constructive interference within internal tissue 160. The angular tilting rotation of at least one of the transducers 302 may cause transmitted ultrasound waves 322 to propagate in a sweeping pattern, e.g., a substantially circular or cyclic pattern, within internal tissue 160. The propagation of ultrasound waves 322 may cause a successive variation of combinations between ultrasound waves 322 transmitted by transducers 302 and provide a continuous shifting of the locations within internal tissue 160 at which constructive interference is produced. The oscillation and direction of ultrasound transmission of multiple transducers 302 may be coordinated to create a constructive interference pattern within internal tissue 160. Shifting the locations of the constructive interference may thoroughly energize the internal tissue treatment region 162 which substantially underlies the location of ultrasound transducers 302, enhancing effectivity of ultrasound delivery to treatment region 162 and possibly allowing to shorten the treatment duration. While at least one of transducers 302 is operational to tiltingly rotate when activated, at least another one of transducers 302 may be a non-tilting ultrasound transducer, i.e., may be operational when activated to transmit ultrasound energy towards internal tissue 160 while rotating at skin tissue at a straight (i.e., non-tilting) angle.

Electrical stimulation may also be applied to skin tissue 150 by electrodes 326, so as to enhance propagation of transmitted ultrasound waves 322 toward internal tissue 160. Electrodes 326 may be coupled to ultrasound device 300, and a controller (not shown) may regulate the activation and electrical parameters of electrodes 326. Alternatively, electrodes 326 may be part of an independent electrical stimulation apparatus, which together with device 300 and a controller may make up a treatment system. Additional features of the treatment system may include, for example: an impedance monitor, a diagnostic imaging device, and the like. Electrical stimulation applied by multiple electrodes 326 may be combined to produce an interferential stimulation, which can substantially reduce, maintain constant, or otherwise change the impedance of the treated tissue 160 in general, and of the tissue treatment region 162 in particular. Ultrasound treatment of body tissue has been found to change (usually increase) the impedance of the treated tissue, which may occur after only several minutes of ultrasound treatment, resulting in a decreased penetration of ultrasound energy and reduced effectivity of treatment. Lowering, maintaining constant, or otherwise altering the tissue impedance, by virtue of electrical stimulation of the body tissue by electrodes 326, may enhance propagation and promote deeper advancement of ultrasound waves 322 into the treated tissue, without having to increase the energy level of ultrasound waves 322. Electrodes 326 may be independent of ultrasound device 300 or electrically coupled with device 300, and/or may be coupled to components of device 300, such as on engagement ring 212 or transducers 302. For example, ultrasound device 300 may include four transducers 302, each of which includes a respective electrode 326, such that electrical stimulation applied by the four transducers 302 generates an interferential beat frequency within a tissue region encompassed by transducers 302. As another example, an electrical stimulation produced by at least one electrode 326 positioned externally to ultrasound device 300 may interact with electrical stimulations produced by additional electrodes 326 of transducers 302 to generate an interferential beat frequency to the tissue region lying therebetween. Further details regarding parameters, a recommended treatment plan, physiological effects, and benefits of interferential electrical stimulation treatment may be found, for example, in U.S. Pat. No. 9,345,909B2 to Ilan Feferberg, entitled "Skin Ulcer Treatment". The types of electrical stimulation applied by electrodes 326 may include transcutaneous electrical nerve stimulation (TENS) and/or high voltage stimulation.

Multiple transducers 302 may be linked to form an integrated transducer unit 308 (FIG. 3B). Transducer unit 308 may be oscillated by at least one oscillator 306 (shown in FIG. 3A). For example, an oscillating of integrated transducer unit 308 at skin tissue 150 maneuvers transducers 302 over skin tissue 150 in a substantially circular motion, i.e., a circular shaped trajectory, where the movement of each transducer 302 corresponds to the movement of integrated transducer unit 308. The oscillating of integrated transducer unit 308 may maneuver transducers 302 in other movement patterns, such as: a side-to-side pattern, a "number-8-shaped" trajectory, and the like. Alternatively, ultrasound transducers 302 may each be configured to oscillate independently when device 300 is substantially stationary at a particular location of skin tissue 150. A circular rotation (or other movement pattern) of transducers 302, when device 300 is positioned at a particular location of skin tissue 150, may serve several purposes. Firstly, the changing position of transducers 302 shifts the locations at which constructive interference is produced within the internal tissue 160, which may further enhance thorough energizing of internal tissue treatment region 162. Secondly, the continuous movement of transducers 302 over skin tissue 150 decreases the exposure of any one area of skin tissue 150 to high energy ultrasound. For example, if the gap (distance) between multiple transducers 302 is equal to the width of each transducer 302, in relation to the circumference of integrated transducer unit 308 into which transducers 302 are integrated, the rotation of unit 308 may alternate the exposure of a given skin tissue area to equal time periods of high energy ultrasound and rest therefrom. This may substantially lower the risk of damaging skin tissue 150 by greater exposure to high energy ultrasound, while prolonging ultrasound transmission toward the underlying internal tissue 160. Moreover, a continuous rotation of integrated transducer unit 308, or independent movement patterns of transducers 302, may produce an additional beneficial massaging effect to the skin tissue 150 and underlying tissue layers.

The tilting oscillating of the ultrasound transducers may be advantageous for enhancing energy delivery to a particular, relatively broad, section 164 of internal tissue 160 underlying the ultrasound device, while reducing direct exposure of the corresponding skin tissue 150 to high energy ultrasound. In order to effectively energize an extensive portion of internal tissue 160 encompassing treatment region 162, while protecting skin tissue 150 from exposure to excessive ultrasound energy, the ultrasound device may be continuously maneuvered over skin tissue 150. Reference is now made to FIG. 4, which is an overhead view illustration of a trajectory along which an ultrasound device, referenced 400, is maneuvered over a skin tissue, operative in accordance with an embodiment of the present invention. Device 400 is systematically maneuvered over skin tissue 150, either manually or automatically (as discussed hereinabove), so as not to omit an area of skin tissue 150, and correspondingly an area of internal tissue 160. The trajectory for systematic maneuvering of device 400 may include, for example: a back and forth trajectory 158, in which device 400 alternatingly travels in a forward direction 182 and a backward direction 184 over skin tissue 150, while advancing in a sideways direction 186; a coiled spring trajectory 159, in which device 400 travels in circles, which are substantially broader than the circular pattern of rotatable ultrasound transducer 402, while advancing in a forward direction 182 and/or a backward direction 184 over skin tissue 150; and/or an alternative trajectory thoroughly encompassing an area of skin tissue 150 that overlies treatment region 162.

By virtue of a tilting rotation of ultrasound transducer 402 against skin tissue 150, as opposed to a perpendicular contact and straight angle rotation as in accepted practice, device 400 may be applied at a selected location on skin tissue 150 for a more prolonged duration. The angled tilt of transducer 402 causes transducer 402 when rotating to sequentially partially contact different portions of the skin surface, which may reduce continuous exposure to high ultrasound energy at a given portion of skin tissue 150.

Figure 5:
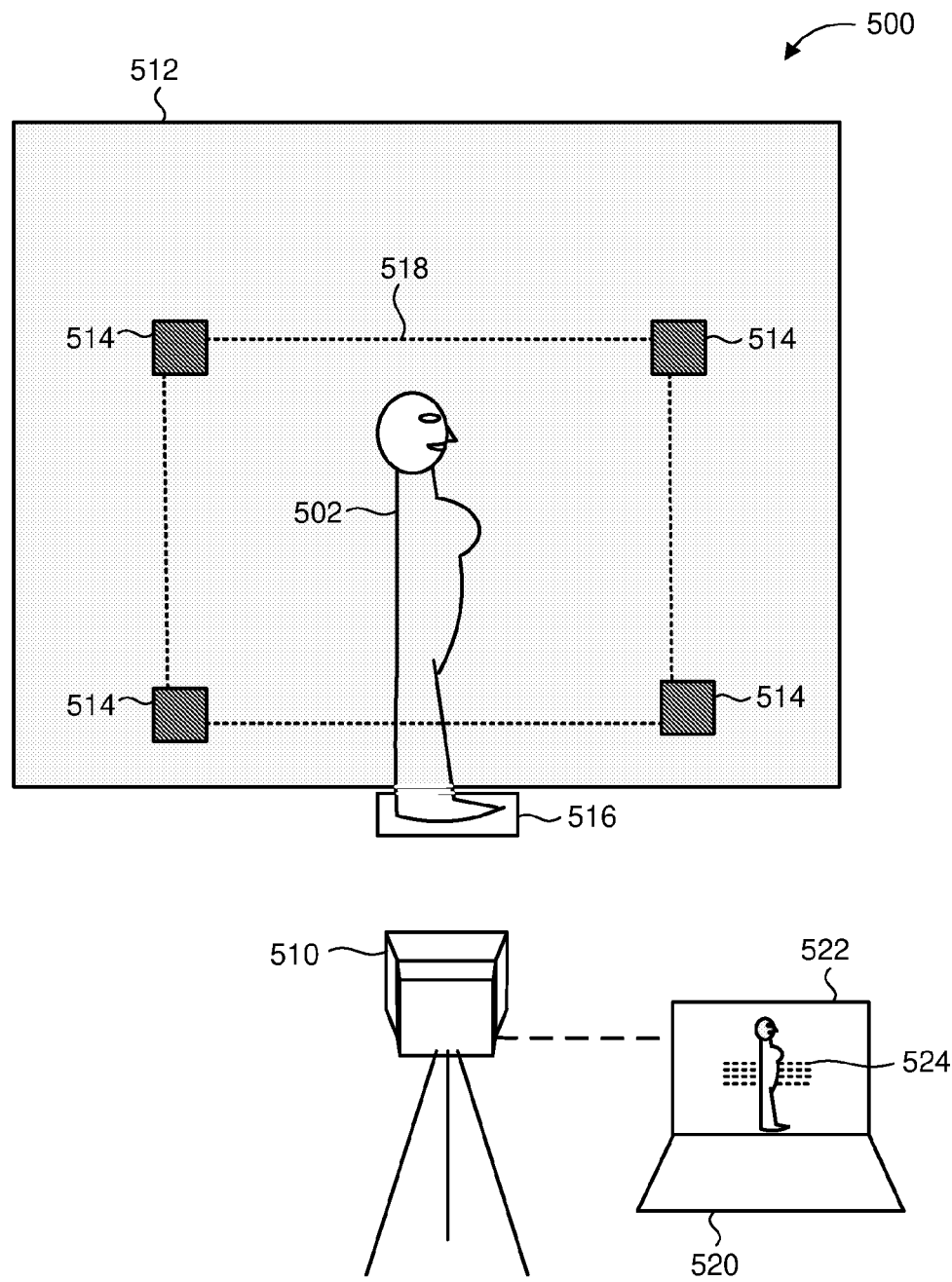
FIG. 5 is an illustration of a measurement assembly for measuring body shape parameters of a body part treated with an ultrasound device, constructed and operative in accordance with an embodiment of the present invention.

Reference is now made to FIG. 5, which is an illustration of a measurement assembly, generally referenced 500, for measuring body shape parameters of a body part treated with an ultrasound device, constructed and operative according to an embodiment of the present invention. Measurement assembly 500 may be utilized for tracking the effectivity of an ultrasound treatment directing to body contouring or body sculpting of one or more body parts, such as an abdomen, a thigh, or an arm. Measurement assembly 500 includes an imaging device 510, a green screen 512, a plurality of scale markers 514, a designated box 516, a processor 520, and a display screen 522. A patient 502 stands erect in front of imaging device 510 within designated box 516. Box 516 is adjacent to green screen 512, which serves as a background of patient 502 within images captured by imaging device 510. Scale markers 514 are positioned at fixed locations and form a substantially two-dimensional (2D) plane 518 which encompasses patient 502, the 2D plane 518 being parallel to green screen 512 and to the lens of imaging device 510. Although the formation of a 2-D plane may be advantageous, scale markers 514 may alternatively be positioned to form a one-dimensional (1D) plane, i.e., two scale markers 514 forming a straight line parallel to the ground, and the 1D or 2D plane may not encompass patient 502. Imaging device 510 captures images of patient 502. Processor 520 receives and processes supplied imaging data. A first processing step may include calculating a pixel/physical length scale of the supplied image (e.g., pixel/cm), by measuring the number of pixels between each pair of scale markers 514, and dividing the measured number by the actual physical distance between the scale markers, which is predefined. A subsequent processing step includes cancelling image content of pixels within the image that depict green screen 512. Next, processor 520 measures the number of pixels within a plurality of spaced apart parallel torso lines 524 (i.e., parallel to each other and to the ground), which span the torso of patient 502 as depicted by imaging device 510, the limits of the torso being identifiable in contradiction to the now empty green screen pixels. Processor 520 converts the measured number of pixels of lines 524 into a length measurement of lines 524 according to a calculated pixel or physical length (e.g., cm) scale. The length measurements may be stored for further analysis and/or provided to an operator. Optionally, the absolute length of the torso of patient 502 may not be of interest, and the change in torso length relative to an initial baseline may be sought instead, in which case a measurement and predefinition of the physical distance of scale markers 514 and a conversion of measured pixels to physical length may not be necessary. Imaging data captured by imaging device 510 and provided to processor 520 may be presented on display screen 522, for example following processing, such that only patient 502 and parallel torso lines 524 are shown. An operator may control and select particular torso lines 524 and particular measurements to display on screen 522. For example, the operator may select a line, or two points, on the torso of patient 502 as displayed upon screen 522, and processor 520 may perform selected measurements relating to the selected line or points, where selected lines may be in different patterns and configurations (e.g., not necessarily straight parallel lines).

Following an ultrasound treatment session directed to body sculpting, a treated body part of patient 502 may be subjected to evaluation using measurement assembly 500. Measurements may be performed at different times after the treatment session, ranging from immediately after the treatment session to several months afterwards. Imaging device 510 may be directed to capture multiple images of patient 502 and the treated body part. For example, images may be captured at a variety of angles, such as a front view, a rear view, a side view, and the like, allowing processor 520 to measure the treated body part from different angles (e.g., using torso lines 524), which can provide a suitable indication of changes in a body shape of the treated body part. It is appreciated that measurements of a treated body part are not limited to parallel torso lines 524, and alternative forms of image processing may be applied for providing an indication of body shape and dimensions of a patient 502 and changes thereof following treatment. Furthermore, other types of sensors may be utilized for measurement, such as radar sensors, which may measure a distance from a radar source to selected points on a treated body part of patient 502, which may provide an indication of the dimensions or shape (e.g., girth) of the body part. Information captured and processed by measurement assembly 500 may be stored for subsequent patient monitoring and analysis and tracking of the patient treatment process.

Figure 6:
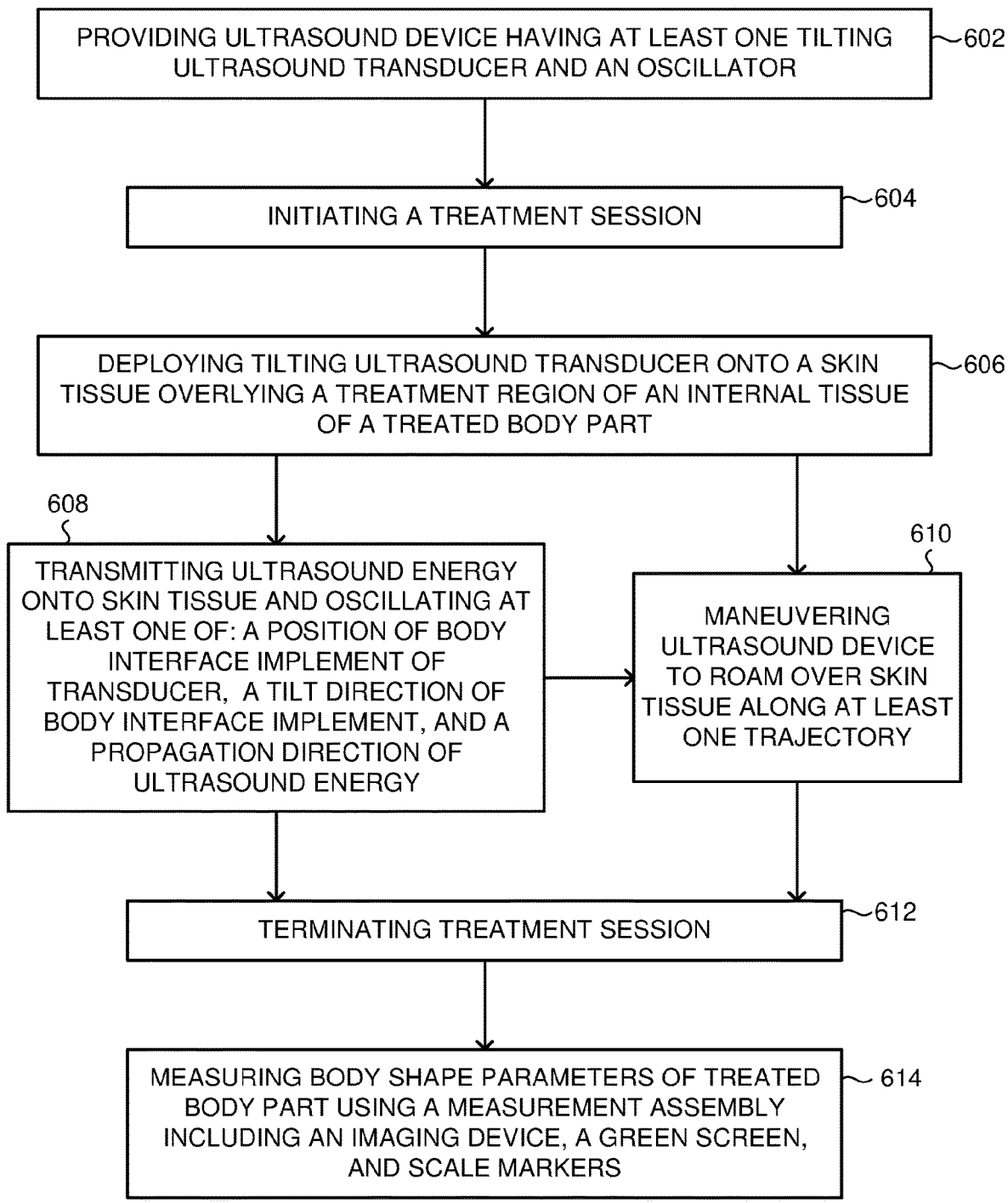
FIG. 6 is a block diagram of a method for ultrasound treatment, operative in accordance with an embodiment of the present invention.

Reference is now made to FIG. 6, which is a block diagram of a method for ultrasound treatment, operative in accordance with an embodiment of the present invention.

In procedure 602, an ultrasound device is provided. The ultrasound device includes an oscillator and at least one tilting ultrasound transducer. Referring for example to FIGS. 1A and 1B, ultrasound device 100 includes main body 110, tilting ultrasound transducer 102, body interface implement 104, and oscillator 106. Ultrasound transducer 102 is operational to transmit ultrasound energy through body interfacing implement 104 which is positioned at a distal end of transducer 102 and interfaces with a treated body part of a patient. Oscillator 106 is operational to oscillate transducer 102, such as by oscillating about an oscillation-axis in relation to skin tissue 150 of the treated body part. For example, oscillator may rotate in a plane substantially parallel to skin tissue 150, to induce a titling rotation of transducer at the surface of skin tissue 150. Oscillator 106 and/or transducer 102 may be powered by a motor 120.

In procedure 604, a treatment session is initiated. Referring to FIGS. 1A-1G, an operator (not shown) initiates an ultrasound treatment session of a patient, such as to apply a therapeutic and/or aesthetic ultrasound treatment to an internal tissue 160 of a body part of the patient.

In procedure 606, the ultrasound transducer is deployed onto a skin tissue overlying a treatment region of an internal tissue of a treated body part. Referring for example to FIGS. 1A-1C and FIG. 2, transducer 102 is positioned on skin tissue 150, overlying treatment region 162 of internal tissue 160, such that body interface implement 104 interfaces with a surface of skin tissue 150. Main body 110 is stabilized at skin tissue 150, such as being maintained at a substantially perpendicular angle thereto, and may be shaped for facilitating gripping by an operator. Engagement ring 112 encompassing transducer 102 may be extended distally to tightly engage skin tissue 150, to help stabilize positioning of device and facilitate close contact of transducer 102 with skin tissue 150. Device 100 may be stably positioned or coupled to skin tissue via at least one stabilizing arm 230 coupled with main body 110, to facilitate automatic maneuvering of device 100 without need for an operator.

In procedure 608, ultrasound energy is transmitted onto the skin tissue, and at least one of: a position of the body interface implement; a tilt direction of the body interface implement; and a propagation direction of ultrasound energy, is oscillated. Referring for example to FIGS. 1A-1G, at least one tilting ultrasound transducer 102 is induced to transmit ultrasound energy onto a skin tissue 150 overlying a treatment region 162 of an internal tissue 160, while oscillating one or more features relating to the transducer 102 or transmitted ultrasound, such as by activating oscillation of oscillator 106. For example, an oscillation of oscillator 106 may induce a rotation of ultrasound transducer 102, such that transducer 102 (and particularly body interface implement 104) moves in a substantially circular pattern along skin tissue 150. An oscillation of oscillator 106 may further induce a tilting of ultrasound transducer 102, so as to repeatedly change a contact angle between transducer 102 (and particularly body interface implement 104) and the surface of skin tissue 150. Transducer 102 may be tilted respective of the surface of skin tissue 150 at a non-perpendicular angle during at least part of an oscillation cycle. An oscillation of oscillator 106 may yet further induce a repeated changing in a propagation direction of the transmitted ultrasound, such as by varying sections of a transducer 102 from which the ultrasound is transmitted or selectively activating different transducers 102. Accordingly, the oscillation may be associated with a dynamic varying of: a location or position of the ultrasound transducer on the skin surface relative to the treatment region; a magnitude of the angle α between body interface implement 104 and the skin surface; and/or a direction toward which the angle α is facing (e.g., relative to true north or to a body part of the patient). Different combinations may be applied between oscillation of ultrasound propagation direction, and oscillation of angle and/or position of the transducer relative to the skin tissue. Different oscillation patterns and combinations may be applied during a treatment session. Referring to FIG. 2, at least one suction unit 214 may apply a vacuum suction on skin tissue, which may provide an additional massaging effect as well as enhancing the coupling or stability of device 200 at the treated body part. Referring to FIG. 3, a plurality of transducers 302 may be activated in a coordinated manner, such that the transmitted ultrasound waves 322 combine to produce a constructive interference within internal tissue 160. At least one of the transducers 302 may be oscillated so as to shift location of constructive interference within internal tissue 160. For example, an angular tilting rotation of at least one transducer 302 may induce the propagation of ultrasound waves 322 in a sweeping pattern. Successive variations in the combined propagations of ultrasound waves 322 may be applied so as to repeatedly shift the locations of constructive interference. A plurality of transducers 302 may form an integrated transducer unit 308, which may undergo oscillation. Electrodes 326 may be applied to provide electrical stimulation at skin tissue 150, such as an interferential electric field stimulation, so as to enhance propagation of transmitted ultrasound waves 322.

Figure 7:
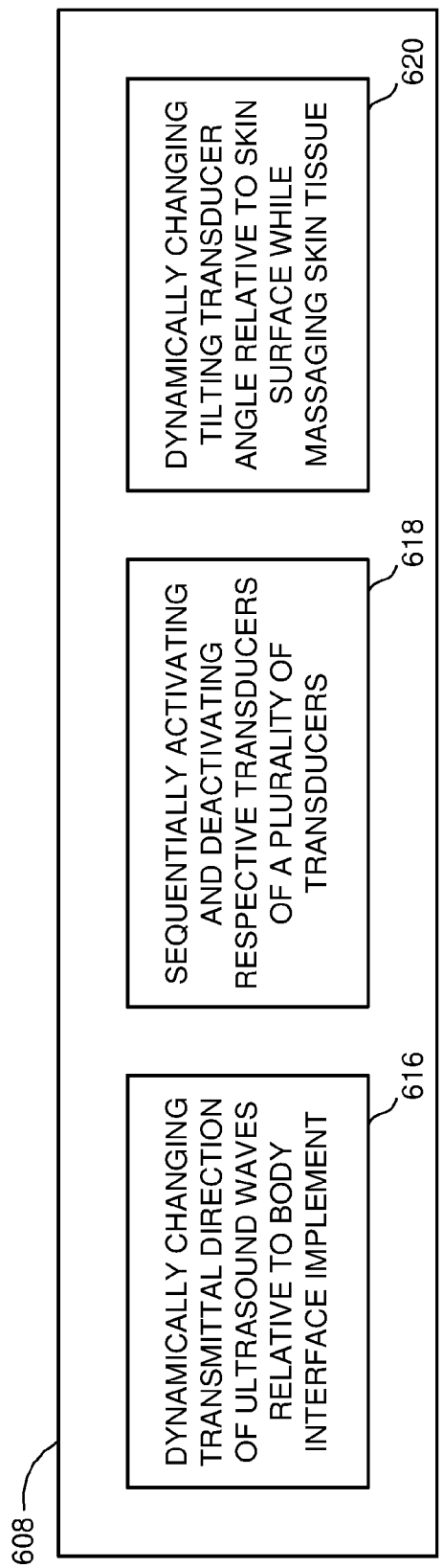
FIG. 7 is a block diagram of a procedure of transmitting ultrasound waves and oscillating of the method for ultrasound treatment of FIG. 6, operative in accordance with an embodiment of the present invention.

Reference is now made to FIG. 7, which is a block diagram of a procedure of transmitting ultrasound waves and oscillating (procedure 608) of the method for ultrasound treatment of FIG. 6, operative in accordance with an embodiment of the present invention. In a sub-procedure 616, a transmittal direction of ultrasound waves relative to the body interface implement is dynamically changed. Referring to FIGS. 1B and 1E, oscillator 106 induces an oscillation in the direction at which ultrasound waves are transmitted from ultrasound transducer 102 in relation to body interface implement 104, specifically relative to a tangent to a central portion of body interface implement 104. The oscillation may be implemented by controlling and regulating the activation and de-activation of different sections of ultrasound transducer 102 to produce ultrasound waves in a particular sequence and/or in a phased array.

In a sub-procedure 618, respective transducers of a plurality of ultrasound transducers are selectively activated and deactivated. Referring to FIGS. 3A and 3B, oscillator 306 activates and deactivates each of a plurality of ultrasound transducers 302 positioned at respective positions on skin tissue 150, according to a designated sequence pattern, such that each transducer 302 selectively transmits ultrasound energy in accordance with the regulated sequence pattern.

In a sub-procedure 620, a tilting transducer angle, formed between an axis parallel to the body interface implement and an axis parallel to the skin surface, is dynamically changed while massaging the skin tissue. Referring to FIGS. 1B and 1C, tilting ultrasound transducer 102 is deployed such that body interface implement 104 of transducer 102 forms an angle α with skin tissue 150. Oscillator 106 induces an oscillation of transducer 102 such that the magnitude and/or direction of angle α dynamically changes, while the oscillation of body interface implement 104 applies a massaging effect to skin tissue 150.

Figure 1F:
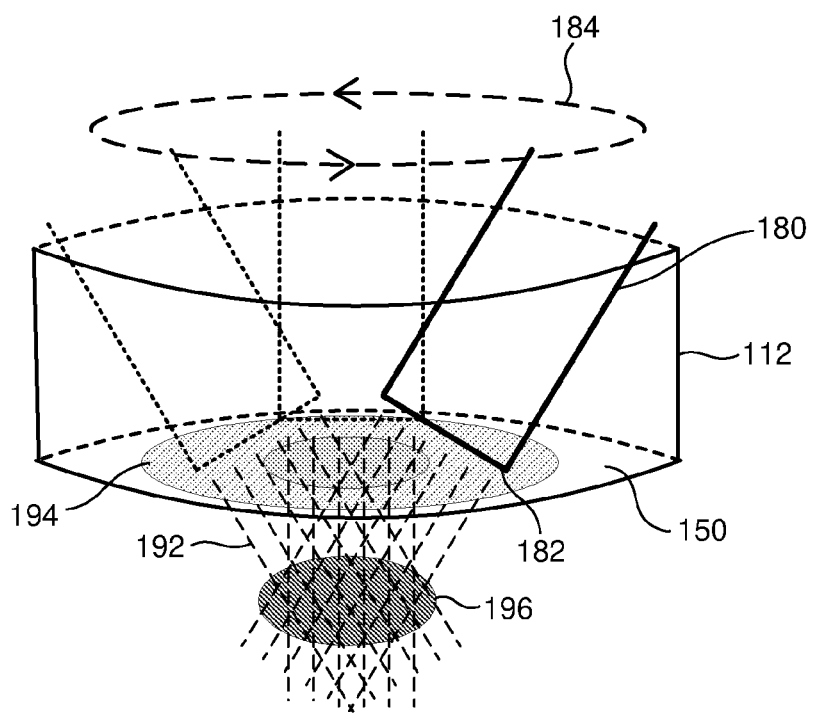
FIG. 1F is an illustration of an ultrasound device with an ultrasound transducer having a ring-shaped skin contact section, constructed and operative according to an embodiment of the present invention.
Figure 1G:
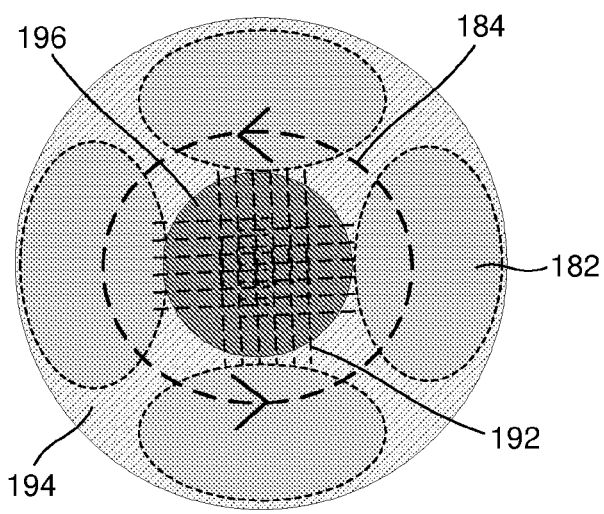
FIG. 1G is a bottom view of the ultrasound device of FIG. 1F.

The dynamic changing of angle α may cause the propagation direction of ultrasound energy directed from transducer 102 to form a sweeping energy pattern, such as a divergent or convergent conic-like pattern, within internal tissue 160, which may depend on the oscillation trajectory of body interface implement 104 and the ultrasound transmittal direction. Referring to FIGS. 1E and 1F, some oscillation patterns may result in ultrasound energizing of an underlying section 164 of internal tissue 160 that is broader than transducer contact section 154 at which transducer 102 is oscillating.

Referring back to FIG. 6, in an optional procedure 610, the ultrasound device is maneuvered to roam over the skin tissue along at least one trajectory. Referring to FIG. 4, ultrasound device 400 is maneuvered over skin tissue 150 (shown in FIG. 1B) to deliver ultrasound energy to an extensive portion of internal tissue 160 encompassing treatment region 162, while protecting skin tissue 150 from exposure to excessive ultrasound energy. Device 400 may be systematically maneuvered, either manually (e.g., by an operator grasping and directing the main body), or automatically (e.g., where the movement is powered by a mechanism, such as motor 220). Device 400 may traverse one or more trajectories, such as a back and forth trajectory 158 or a coiled spring trajectory 159, such as to thoroughly pass over all applicable regions of skin tissue 150 for effectively directing ultrasound to a substantially extensive portion of treatment region 162. Referring to FIG. 2, one or more stabilizing arms 230 and transporters 232 may be applied to facilitate the movement of ultrasound device 200.

In procedure 612, a treatment session is terminated. Referring to FIGS. 1A-1G, an operator (not shown) terminates the ultrasound treatment session (previously initiated in procedure 604).

In procedure 614, body shape parameters of the treated body part are measured, using a measurement assembly including an imaging device, a green screen, and scale markers. Referring to FIG. 5, measurement assembly 500 is utilized to track effectivity of the ultrasound treatment, such as a body sculpting treatment using an oscillating ultrasound device of the disclosed embodiments.

Figure 8:
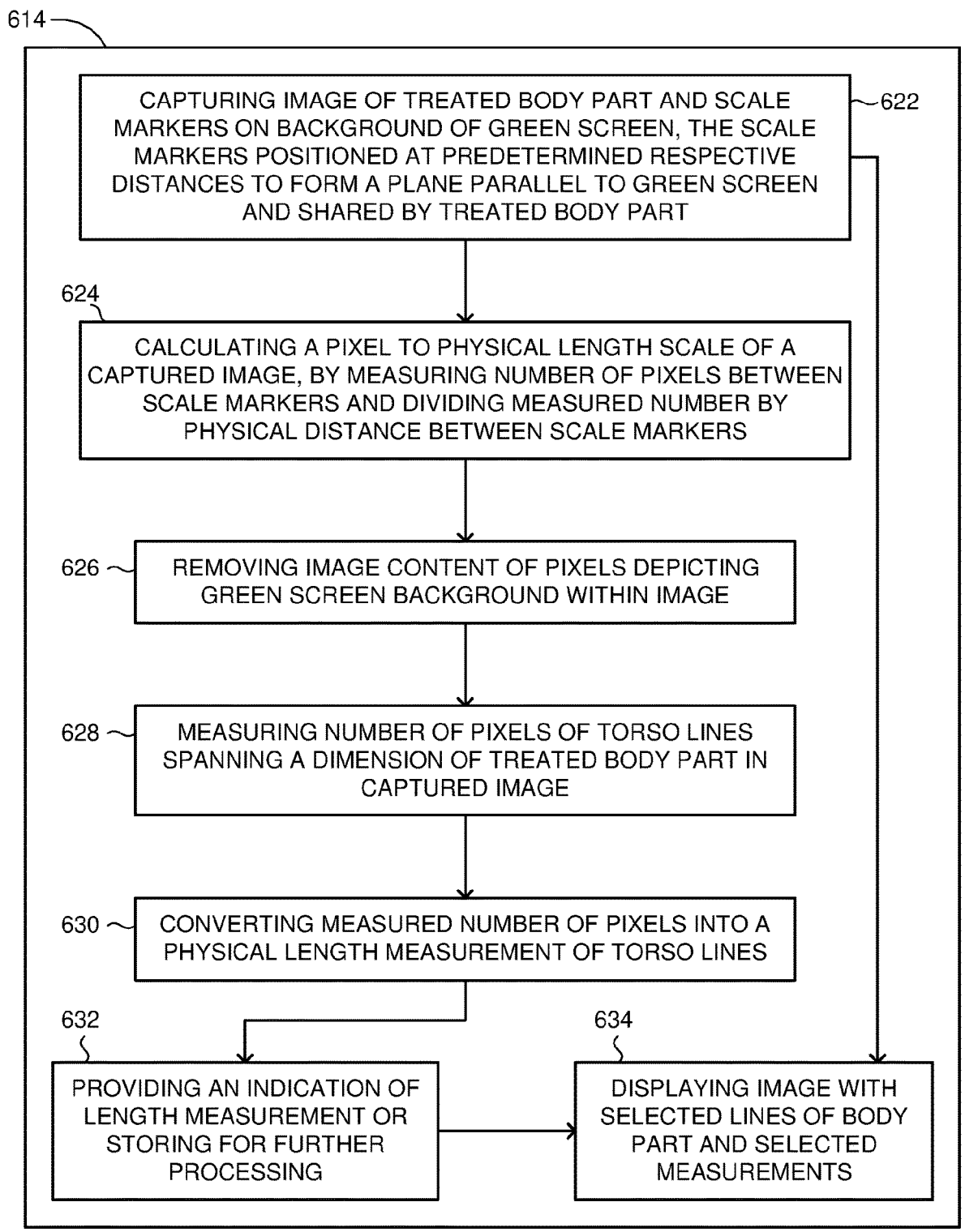
FIG. 8 is a block diagram of a procedure of measuring body shape parameters of the method for ultrasound treatment of FIG. 6, operative in accordance with an embodiment of the present invention.

Reference is now made to FIG. 8, which is a block diagram of a procedure for measuring body shape parameters (procedure 614) of the ultrasound treatment method of FIG. 6, operative in accordance with an embodiment of the present invention. In a sub-procedure 622, an image of a treated body part and scale markers are captured on a background of a green screen, the scale markers positioned at predetermined respective distances to form a plane parallel to the green screen and shared by the treated body part. Referring to FIG. 5, a patient 502 is positioned in front of green screen 512 (e.g., standing on designated box 516) and imaged by imaging device 510, such as to capture a treated body part of patient 502 from multiple viewing angles. The captured images further include a plurality of scale markers 514 forming a planar surface, such as a 2D plane or a 1D plane (line), parallel to green screen 512 and the lens of imaging device 510.

In a sub-procedure 624, a pixel to physical length scale of a captured image is calculated, by measuring a number of pixels between scale markers and dividing the measured number by the physical distance between the scale markers. Referring to FIG. 5, for each captured image processor 520 determines a scale of pixel/physical length (e.g., pixel/cm) for the image by measuring the number of pixels between each pair of scale markers 514 within the captured image and dividing the measured number of pixels by the actual length (physical distance) between scale markers 514, which may be a predefined metric.

In a sub-procedure 626, image content of pixels depicting a green screen background within the captured image is removed. Referring to FIG. 5, processor 520 removes or eliminates image content relating to image pixels representing green screen 512 in the captured image.

In a sub-procedure 628, the number of pixels of torso lines spanning a dimension of the treated body part is measured in the captured image. Referring to FIG. 5, processor 520 measures the number of pixels in each of parallel torso lines 524, which span the length and/or breadth of the torso (or other treated body part) of patient 502. In a sub-procedure 630, the measured number of torso lines pixels is converted into a physical length measurement of the torso lines. Referring to FIG. 5, processor 520 converts the measured number of pixels in each of torso lines 524 into a physical length measurement (e.g., cm), using the previously calculated pixel to physical length scale for the captured image.

In a sub-procedure 632, an indication of the length measurement is provided or is stored for further processing. Referring to FIG. 5, processor 520 provides an indication of the determined (physical) body shape parameters measurements to an operator, such as via display screen 522, and/or stores the measurements for further analysis and patient monitoring. Additional measurements may be obtained at subsequent times after the treatment session. The body shape parameters measurements may be utilized for tracking the effectiveness of the ultrasound treatment.

In a sub-procedure 634, an image with selected lines of the body part and selected measurements may be displayed. Referring to FIG. 5, display screen 522 may display images captured by imaging device 520, such as depicting patient 502 and parallel torso lines 524. An operator may select particular body part features or particular measurements to be displayed. For example, an operator may select one or more points or lines in a certain pattern or configuration (e.g., a curved line or a set of intersecting lines) and select measurements of the selected points or lines (e.g., a physical length) to be determined and displayed.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A system for ultrasound treatment, the system comprising:
   an ultrasound device comprising:
      at least one tilting ultrasound transducer, comprising a body interface implement, the tilting ultrasound transducer configured to be deployed and transmit ultrasound energy onto a skin tissue overlying a treatment region of an internal tissue of a treated body part, such that the body interface implement interfaces with a surface of the skin tissue; and
      a motor-driven oscillator, coupled with the tilting ultrasound transducer, and configured to oscillate about an oscillation-axis relative to a surface of the skin tissue, such that at least one of: a position of the body interface implement; and a tilt direction of the body interface implement, oscillates about the oscillation-axis; and
   a measurement assembly, configured for measuring body shape parameters of the treated body part with said ultrasound device, the measurement assembly comprising:
      a green screen;
      a plurality of scale-markers, positioned at a predetermined respective distance from each other to form a one-dimensional or two-dimensional plane parallel to the green screen, wherein the one-dimensional or two-dimensional plane is shared by the treated body part;
      at least one imaging device, operational for capturing images of the treated body part and the scale-markers on a background of the green screen; and
      a processor, configured to receive the images from the imaging device and to process the images to measure body shape parameters of the treated body part.

2. The system of claim 1, wherein the oscillator is configured to oscillate a propagation direction of the ultrasound energy by dynamically changing a transmittal direction of ultrasound waves relative to the body interface implement.

3. The system of claim 1, wherein the ultrasound device comprises a plurality of ultrasound transducers, and wherein the oscillator is configured to oscillate a propagation direction of the ultrasound energy by sequentially activating and deactivating respective ones of the ultrasound transducers according to a sequence pattern.

4. The system of claim 1, wherein the body interface implement is configured to be tilted with respect to the surface of the skin tissue, forming a non-straight tilting transducer angle between an axis parallel to the body interface implement and an axis parallel to the skin surface, and wherein the oscillator is configured to oscillate so as to dynamically change the tilting transducer angle, while the body interface implement massages the skin tissue.

5. The system of claim 1, wherein the ultrasound device is configured to be maneuvered over the skin tissue along at least one trajectory.

6. The system of claim 1, further comprising a distal engagement ring, encompassing the tilting ultrasound transducer and configured to be selectively extended distally to engage the skin tissue, so as to stabilize the ultrasound device when the tilting ultrasound transducer is activated.

7. The system of claim 1, further comprising a plurality of electrodes configured to apply interferential electrical stimulation to the skin tissue during operation of the tilting ultrasound transducer.

8. The system of claim 1, further comprising at least one suction unit configured to apply vacuum suction to the skin tissue during operation of the tilting ultrasound transducer.

9. The system of claim 1, further comprising at least one stabilizing arm coupled with a main body of the ultrasound device, for stably positioning and facilitating maneuvering of the ultrasound device.

10. The system of claim 1, wherein the ultrasound device comprises a plurality of tilting ultrasound transducers, and wherein the oscillator is configured to coordinate oscillation of a plurality of the tilting ultrasound transducers to create an interference pattern in the internal tissue.

11. The system of claim 1, wherein the ultrasound device comprises a plurality of tilting ultrasound transducers forming an integrated transducer unit configured to oscillate at the skin tissue, such that each of the transducers moves correspondingly with the oscillation of the integrated transducer unit.

12. A method for ultrasound treatment, the method comprising the procedures of:
   deploying at least one tilting ultrasound transducer of an ultrasound device onto a skin tissue overlying a treatment region of an internal tissue of a treated body part, the tilting ultrasound transducer comprising a body interface implement;
   inducing the tilting ultrasound transducer to transmit ultrasound energy onto the skin tissue, such that the body interface implement interfaces with a surface of the skin tissue;
   oscillating a motor-driven oscillator, coupled with the tilting ultrasound transducer, about an oscillation-axis relative to a surface of the skin tissue, such that at least one of: position of the body interface implement; and a tilt direction of the body interface implement, oscillates about the oscillation-axis;
   measuring body shape parameters of the treated body part, by:
      positioning the treated body part in front of a green screen of a measurement assembly;
      positioning a plurality of scale-markers of the measurement assembly at a predetermined respective distance from each other to form a one-dimensional or two-dimensional plane parallel to the green screen, wherein the one-dimensional or two-dimensional plane is shared by the treated body part;
      capturing images of the treated body part and the scale-markers on a background of the green screen, with at least one imaging device of the measurement assembly; and processing the images to measure body shape parameters of the treated body part.

13. The method of claim 12, wherein the oscillating of the oscillator is configured to oscillate a propagation direction of the ultrasound energy by dynamically changing a transmittal direction of ultrasound waves relative to the body interface implement.

14. The method of claim 12, wherein the ultrasound device comprises a plurality of ultrasound transducers, and wherein the oscillating of the oscillator is configured to oscillate a propagation direction of the ultrasound energy by sequentially activating and deactivating respective ones of the ultrasound transducers according to a sequence pattern.

15. The method of claim 12, wherein the body interface implement is configured to be tilted with respect to the surface of the skin tissue, forming a non-straight tilting transducer angle between an axis parallel to the body interface implement and an axis parallel to the skin surface, and wherein the oscillating of the oscillator is configured to dynamically change the tilting transducer angle while the body interface implement massages the skin tissue.

16. The method of claim 12, further comprising the procedure of maneuvering the ultrasound device over the skin tissue along at least one trajectory.

17. The method of claim 12, further comprising the procedure of selectively extending a distal engagement ring, encompassing the tilting ultrasound transducer, distally to engage the skin tissue, so as to stabilize the ultrasound device when the tilting ultrasound transducer is activated.

18. The method of claim 12, further comprising the procedure of applying interferential electrical stimulation to the skin tissue, using a plurality of electrodes, during the operation of the tilting ultrasound transducer.

19. The method of claim 12, further comprising the procedure of applying a vacuum suction to the skin tissue, using at least one suction unit, during the operation of the tilting ultrasound transducer.

20. The method of claim 12, further comprising the procedure of coordinating the oscillation of a plurality of tilting ultrasound transducers to create an interference pattern in the internal tissue.

* * * * *